A map update determination system includes a traveling plan generation unit generating, based on a target route of a vehicle set in advance and map information, a traveling plan of the vehicle including a control target value for the vehicle in accordance with a position on the target route, a detection value acquisition unit acquiring, in association with the position on the target route, a control result detection value resulting from an automatic driving control for the vehicle executed based on a road environment in a vicinity of the vehicle, a traveling situation of the vehicle, a position of the vehicle, and the traveling plan, an evaluation value calculation unit calculating an evaluation value of the traveling plan for each zone, and a map update determination unit determining a necessity of an update of the map information for each zone.

8 Claims, 13 Drawing Sheets

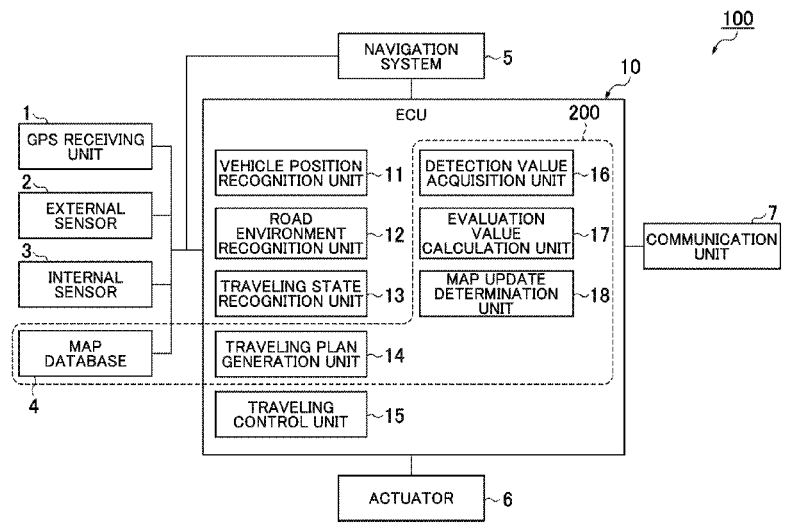

(56) References Cited

U.S. PATENT DOCUMENTS

| | | |
|---|---|---|
| 2009/0326713 A1 | 12/2009 | Moriya |
| 2011/0047338 A1 | 2/2011 | Stahlin et al. |
| 2011/0125401 A1 | 5/2011 | Stählin |
| 2013/0006925 A1* | 1/2013 | Sawai ................ G01C 21/32 707/609 |
| 2013/0110343 A1 | 5/2013 | Ichikawa et al. |
| 2013/0158821 A1 | 6/2013 | Ricci |
| 2013/0245941 A1 | 9/2013 | Stählin et al. |
| 2016/0282127 A1* | 9/2016 | Goto ................... G01C 21/30 |
| 2017/0123434 A1* | 5/2017 | Urano ................. B60Q 9/008 |

FOREIGN PATENT DOCUMENTS

| | | |
|---|---|---|
| JP | 2002-116689 A | 4/2004 |
| JP | 2009-291540 A | 12/2009 |
| JP | 2011-521326 A | 7/2011 |
| JP | 2011-162132 A | 8/2011 |
| JP | 5227065 B2 | 3/2013 |
| JP | 5382218 B2 | 10/2013 |
| JP | 2014-151758 A | 8/2014 |
| WO | 2007094371 A1 | 8/2007 |
| WO | 2011/158347 A1 | 12/2011 |

\* cited by examiner

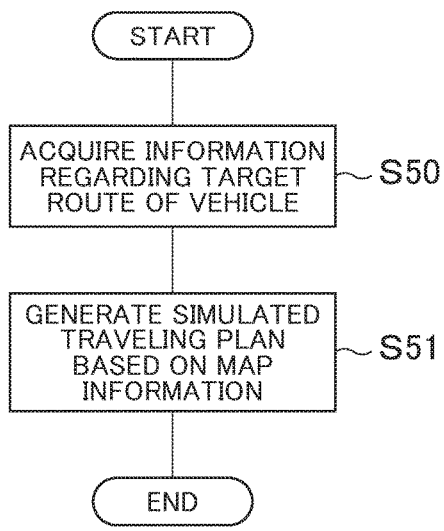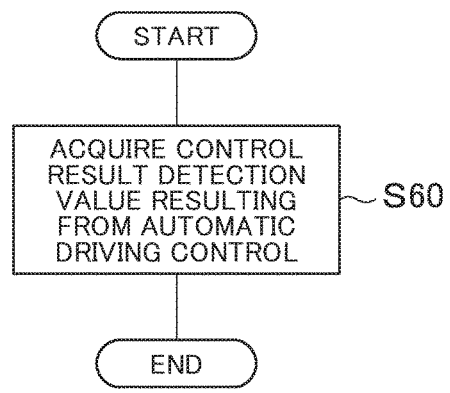
*FIG.10A*    *FIG.10B*

*FIG. 13A*   *FIG. 13B*
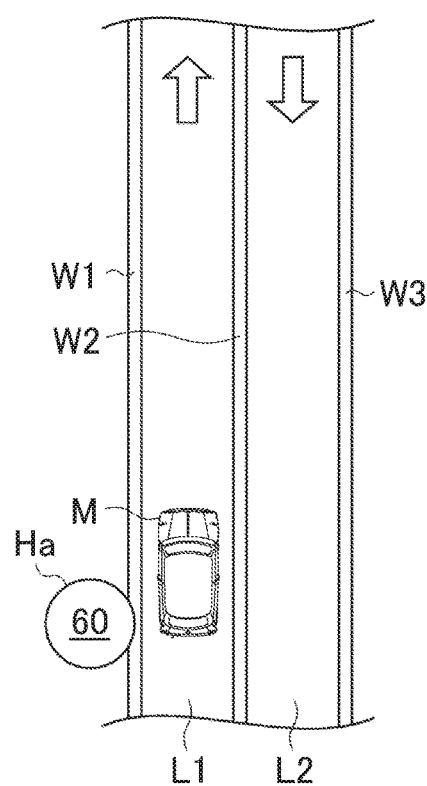
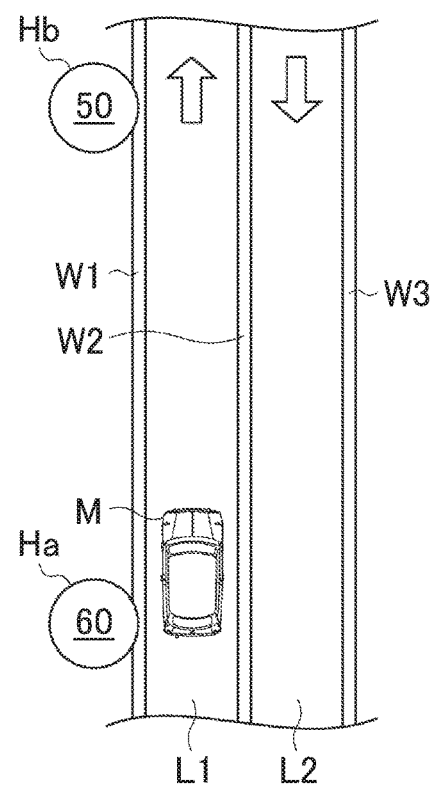

MAP UPDATE DETERMINATION SYSTEM

CROSS-REFERENCE TO RELATED APPLICATIONS

This application claims priority from Japanese Patent Application No. 2015-216960 filed on Nov. 4, 2015, the disclosure of which, including the specification, drawings and abstract is incorporated herein by reference in its entirety.

BACKGROUND

1. Technical Field

This disclosure relates to a map update determination system that determines a necessity of a map information update.

2. Description of Related Art

Japanese Patent Application Publication No. 2002-116689 (JP 2002-116689A) is known as technical literature relating to a device that determines a necessity of an update of map information. JP 2002-116689A discloses a map information-providing system for providing map information in response to a request from a vehicle. This system acquires trajectory data relating to a trajectory in which the vehicle travels in order to update the map information. In this map information-providing system, in a case where the trajectory data has been acquired from the vehicle, the map information is updated with the trajectory data and regarded as new road information when a road corresponding to the trajectory data is not set in the map information.

In recent years, automatic driving control is developing which allows the vehicle to travel without a driving operation performed by a driver. Appropriate map information is required for the automatic driving control to be performed. In the map information-providing system according to the related art described above, however, nothing has been proposed in relation to an update method for a case where the map information becomes outdated due to topographic changes (in, for example, lane width and road curvature) attributable to construction works or the like. In a case where the map update is performed once every certain period of time based on a determination that the map information has become outdated, map information maintenance costs will increase if this certain period of time is short. In contrast, if this certain period of time is long, the map information may become outdated map information inappropriate for the automatic driving control. In this regard, a technique that allows the necessity of the map information update to be determined at an appropriate time during the automatic driving control is required to eliminate these possibilities.

SUMMARY

An aspect of this disclosure provides a map update determination system that is capable of performing an appropriate map information update necessity determination by using an automatic driving control for a vehicle.

According to a non-limiting aspect of the disclosure, there is provided a map update determination system with a map database in which map information used for an automatic driving control for a vehicle is stored and determining, for each zone set in advance, a necessity of an update of the map information in the zone set in advance, the map update determination system including a traveling plan generation unit generating, based on a target route of the vehicle set in advance and the map information, a traveling plan of the vehicle including a control target value for the vehicle in accordance with a position on the target route, a detection value acquisition unit acquiring, in association with the position on the target route, a control result detection value resulting from the automatic driving control for the vehicle executed, based on a road environment in a vicinity of the vehicle recognized by an external sensor of the vehicle being used, a traveling state of the vehicle recognized by an internal sensor of the vehicle being used, a position of the vehicle measured by a position measurement unit of the vehicle, and the traveling plan, an evaluation value calculation unit calculating an evaluation value of the traveling plan for the zone based on a result of a comparison between the control target value and the control result detection value, and a map update determination unit determining the necessity of the update of the map information on the zone based on the evaluation value of the traveling plan and an evaluation threshold.

In the map update determination system according to a non-limiting aspect of this disclosure, the control target value of the traveling plan depending on the map information and the control result detection value resulting from the automatic driving control in accordance with an actual road environment differ from each other in a case where the map information is inconsistent with the actual road environment, and thus, the necessity of the update of the map information on the zone may be determined based on the evaluation value of the traveling plan for the zone calculated from the result of the comparison between the control target value and the control result detection value and the evaluation threshold. Hence, according to the map update determination system, an appropriate map information update necessity determination may be performed by the automatic driving control for the vehicle being used.

According to a non-limiting aspect of this disclosure, there is provided a map update determination system provided with a server capable of communicating with a vehicle performing an automatic driving control and a map database disposed in the server, map information being stored in the map database, and determining a necessity of an update of the map information in a zone set in advance, the map update determination system including an information acquisition unit disposed in the server and acquiring information on a target route of the vehicle, a simulated traveling plan generation unit disposed in the server and generating, based on the target route and the map information of the map database, a simulated traveling plan of the vehicle including a simulated control target value for the vehicle in accordance with a position on the target route, a detection value acquisition unit disposed in the server and acquiring, in association with the position on the target route, a control result detection value resulting from the automatic driving control for the vehicle executed, based on a road environment in a vicinity of the vehicle recognized by an external sensor of the vehicle being used, a traveling state of the vehicle recognized by an internal sensor of the vehicle being used, a position of the vehicle measured by a position measurement unit of the vehicle, and a traveling plan of the vehicle generated from the target route and map information of an in-vehicle map database mounted in the vehicle, an evaluation value calculation unit disposed in the server and calculating an evaluation value of the simulated traveling plan for the zone based on a result of a comparison between the simulated control target value and the control result detection value, and a map update determination unit disposed in the server and determining the necessity of the update of the map information of the map database on the zone based on the evaluation value of the simulated traveling plan and an evaluation threshold.

In the map update determination system according to a non-limiting aspect of the disclosure, the simulated control target value of the simulated traveling plan depending on the map information and the control result detection value resulting from the automatic driving control in accordance with an actual road environment differ from each other in a case where the map information of the map database having the server is inconsistent with the actual road environment, and thus, the necessity of the update of the map information on the zone may be determined based on the evaluation value of the simulated traveling plan for the zone calculated from the result of the comparison between the simulated control target value and the control result detection value and the evaluation threshold. Hence, according to this map update determination system, an appropriate map information update necessity determination may be performed by the automatic driving control for the vehicle being used.

In the map update determination system according to a first aspect or the second aspect of the disclosure, the map update determination unit may set the evaluation threshold for the zone based on a position of the zone in the map information of the map database or a traveling time of the vehicle in the zone. According to this map update determination system, an appropriate map information update necessity determination in accordance with the position of the zone may be performed, by the evaluation threshold for the zone being set based on the position of the zone, in that a higher level of map information accuracy is required for a zone in an urban area than for a suburban zone. Alternatively, according to this map update determination system, an appropriate map information update necessity determination in accordance with the traveling time can be performed, by the evaluation threshold for the zone being set based on the traveling time of the vehicle in the zone, in that an accuracy of white line recognition using an image captured by a camera and the like declines more at night than in a daytime and this affects a reliability of the map information update necessity determination.

According to the first aspect or the second aspect of the disclosure, the map update determination system can be provided that is capable of performing the appropriate map information update necessity determination by using the automatic driving control for the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 10A is a flowchart illustrating a simulated traveling plan generation processing of the map update determination system according to the second embodiment;

FIG. 10B is a flowchart illustrating a control result detection value acquisition processing of the map update determination system according to the second embodiment;

FIG. 13A is a plan view illustrating a road before a change in speed regulation information; and FIG. 13B is a plan view illustrating the road after the change in speed regulation information.

DETAILED DESCRIPTION OF EMBODIMENTS

Figure 1:
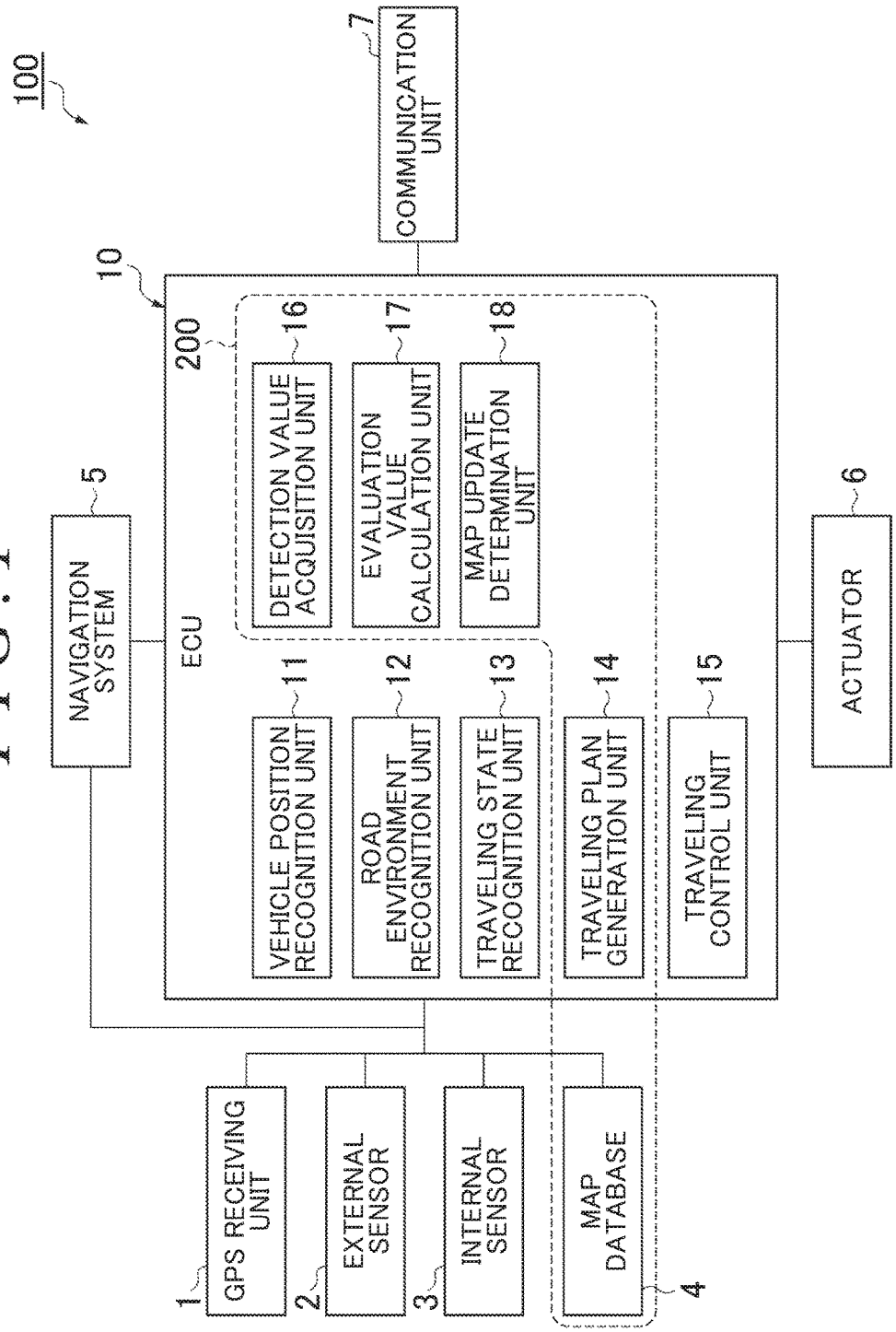
FIG. 1 is a block diagram illustrating an automatic driving system including a map update determination system according to a first embodiment.

Hereinafter, preferred embodiments of the disclosure will be described in detail with reference to accompanying drawings. In the following description, the same reference numerals will be used to refer to the same components or components that have the same functions so that the same description is not repeated.

First Embodiment

FIG. 1 is a block diagram illustrating an automatic driving system 100 that includes a map update determination system 200 according to a first embodiment. An overview of the automatic driving system 100 will be described first, and then an overview of the map update determination system 200 will be described. Then, a configuration of the automatic driving system 100 that includes the map update determination system 200 will be described, followed by description of various types of processing in the automatic driving system 100.

The automatic driving system 100 is a system that is mounted in a vehicle such as a passenger car in order to perform an automatic driving control for the vehicle. In a case where an automatic driving control initiation operation is performed by a driver (by, for example, an automatic driving control initiation button being pressed by the driver), the automatic driving system 100 initiates the automatic driving control for the vehicle.

The automatic driving control is a vehicle control that enables automatic vehicle traveling along a target route set in advance. During the automatic driving control, the vehicle travels automatically and the driver does not have to perform a driving operation. The target route is a route on a map along which the vehicle travels during the automatic driving control. Setting of the target route will be described in detail later.

The automatic driving system 100 uses map information in order to carry out the automatic driving control. The map information includes road position information (position information by lane), road shape information (curves, types of linear portions, curvatures of the curves, and the like), road width information (lane width information), and vehicle speed limit information regarding roads. The map information also includes position information regarding points of intersection and junctions, position information regarding temporary stop lines, crosswalk position information, and traffic light position information. The map information may also include road gradient information and road cant information.

In addition, the map information may include information regarding positions and shapes of fixed obstacles such as curbs, telephone poles, poles, guardrails, walls, and buildings. The map information may include information regarding positions and shapes of road surface paints such as characters and marks drawn on road surfaces. The road surface paint may include a manhole. The map information may also include information regarding signboards disposed over the roads and information regarding signs disposed on roadsides.

The automatic driving system 100 generates a traveling plan that is used for the automatic driving control based on the target route and the map information. The traveling plan is a plan for a vehicle traveling along the target route from a current position of the vehicle to a destination tens of kilometers ahead of the current position of the vehicle. This traveling plan is generated based on the map information.

A control target value for the vehicle that depends on the position of the vehicle on the target route is included in the traveling plan. The position on the target route is a position on the map in a direction in which the target route extends. Positions on the target route are longitudinal positions that are set at predetermined intervals (such as 1 m) in the direction in which the target route extends.

The control target value is a vehicle control target value in the traveling plan. The control target value is set in association with each of the set longitudinal positions on the target route. The control target value includes a target lateral position of the vehicle and a target vehicle speed of the vehicle.

The target lateral position is a control target lateral position of the vehicle in the traveling plan. The lateral position of the vehicle is the position of the vehicle in a road width direction (lane width direction) of the road on which the vehicle travels. The lane width direction is a direction orthogonal, on the road surface of the road, to a white line that forms the lane of the road. In addition, the position of the vehicle in a road extension direction (direction orthogonal to the road width direction) will be referred to as a longitudinal position of the vehicle. The longitudinal position of the vehicle is the position of the vehicle in the direction in which the target route extends. The target vehicle speed is a control target vehicle speed of the vehicle in the traveling plan.

The automatic driving system 100 recognizes a road environment in a vicinity of the vehicle based on an image captured by an in-vehicle camera, a result of detection by in-vehicle lidar, a result of detection by an in-vehicle radar, or the like. The road environment includes positions of the white lines that form a traveling lane in which the vehicle travels, line types of the white lines, road shapes (including road curvatures), lane widths, and positions of fixed obstacles. Fixed obstacles include buildings, walls, guardrails, telephone poles, and the like. The road environment may include traveling lane cants and traveling lane gradients.

The automatic driving system 100 also recognizes a traveling state of the vehicle based on results of detection by a vehicle speed sensor of the vehicle and the like. The traveling state includes the vehicle speed of the vehicle, an acceleration of the vehicle, and a yaw rate of the vehicle. In addition, the automatic driving system 100 measures the position of the vehicle based on a result of measurement by a global positioning system [GPS] receiving unit (described later). The automatic driving system 100 may measure the position of the vehicle by using the fixed obstacle position information included in the map information, the results of the detection by the in-vehicle radar and the like, and simultaneous localization and mapping [SLAM] technology.

The automatic driving system 100 carries out the automatic driving control based on the road environment in the vicinity of the vehicle, the traveling state of the vehicle, the position of the vehicle, and the traveling plan. The automatic driving system 100 performs the automatic driving control for the vehicle in accordance with the traveling plan in a case where the map information has no error and corresponds to the actual road environment. The automatic driving control for the vehicle in accordance with the traveling plan is an automatic driving control for controlling the vehicle such that the actual lateral position of the vehicle and the actual vehicle speed of the vehicle at the set longitudinal position of the target route correspond to the target lateral position and the target vehicle speed at that set longitudinal position.

In a case where the map information has an error and the map information is inconsistent with the actual road environment, the automatic driving system 100 carries out an automatic driving control responding to the actual road environment. Specifically, the automatic driving system 100 carries out an automatic driving control for temporarily stopping the vehicle, with priority given to the actual road environment over the traveling plan, when the temporary stop line in front is detected in the image captured by the in-vehicle camera in a case where the traveling plan has been generated such that the vehicle travels at a constant speed.

In a case where the traveling plan has been generated such that the vehicle travels over a certain distance at a constant speed, the automatic driving system 100 carries out an automatic driving control for causing the vehicle to travel and follow a preceding car traveling at a lower speed than the constant speed in front of the vehicle, with priority given to the actual road environment over the traveling plan, when the preceding car is present in front of the vehicle.

Hereinafter, the overview of the map update determination system 200 according to the first embodiment will be described. The map update determination system 200 is a system that determines whether the map information of a map database mounted in the vehicle (the map information that is used for the automatic driving control for the vehicle) needs to be updated or not. As illustrated in FIG. 1, the map update determination system 200 according to the first embodiment forms a part of the automatic driving system 100. A specific configuration of the map update determination system 200 will be described later. The vehicle in which the automatic driving system 100 is mounted may also be a probe car that is provided with various sensors for map information update. In other words, the automatic driving system 100 according to this embodiment may be mounted in a probe car.

Figure 2:
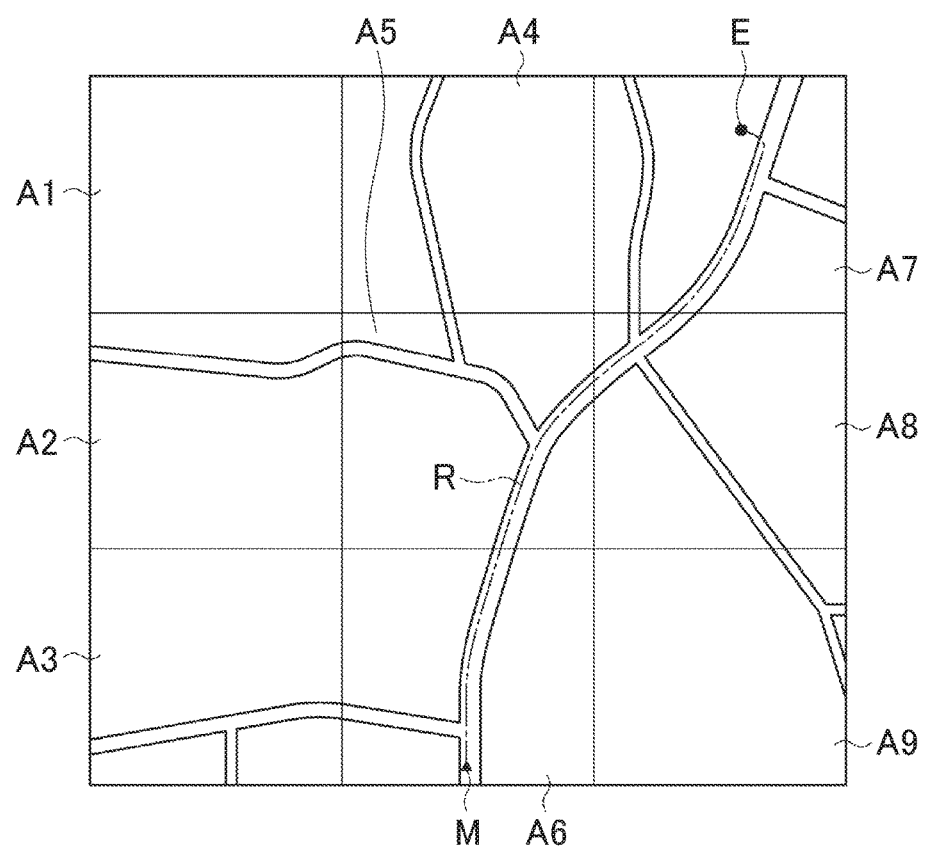
FIG. 2 is a diagram for showing an example of a zone as an object of a map information update determination.

The map update determination system 200 determines the necessity of the update of the map information in a zone set in advance. The zone is set in accordance with a storage format (conservation format) of the map information in the map database. FIG. 2 is a diagram for showing an example of the zone as an object of the map information update determination. Zones A1 to A9, a vehicle M, a target route R of the vehicle M, and a destination E of the target route R are illustrated in FIG. 2. In the case of a storage format in which the map information is stored in the map database with the map information divided in the form of tiles (i.e. square tiles, rectangular tiles, or the like) as illustrated in FIG. 2, the zones A1 to A9 that have the form of the divided tiles are the objects of the map information update necessity determination. In this case, the map update determination system 200 performs the map information update necessity determination for each of the tile-shaped zones A1 to A9. In addition, the map update determination system 200 performs the map information update for each of the tile-shaped zones A1 to A9. The map update determination system 200 may determine the necessity of the map information update in any single one of the tile-shaped zones A1 to A9 as well.

Figure 3:
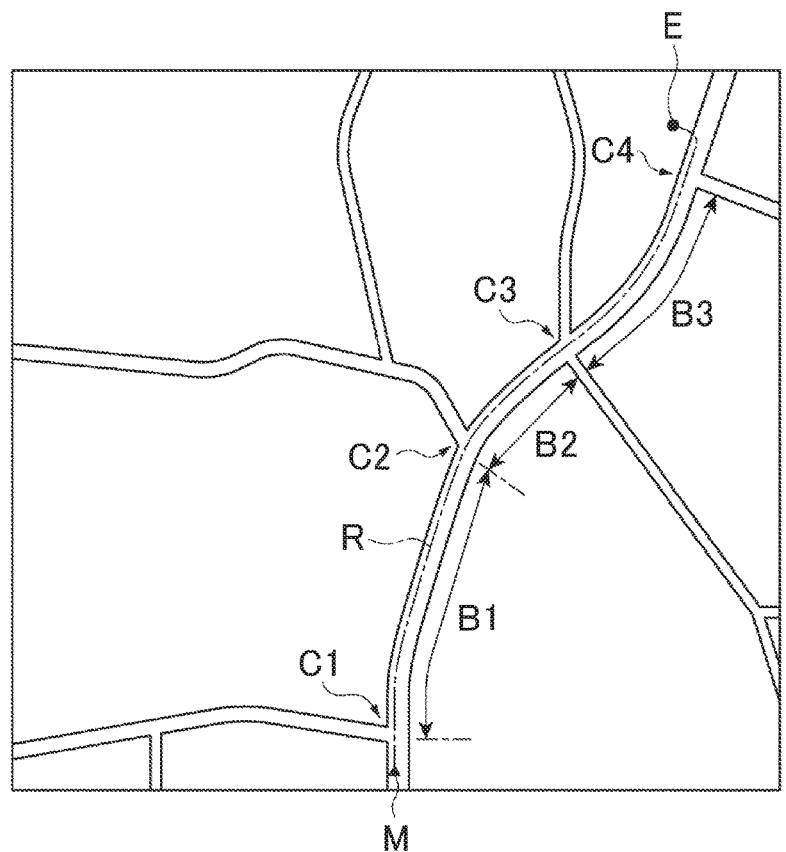
FIG. 3 is a diagram for showing another example of the zone as the object of the map information update determination.

FIG. 3 is a diagram for showing another example of the zone as the object of the map information update determination. Zones B1 to B3 and points of intersection C1 to C4 are illustrated in FIG. 3. In the case of a storage format in which the road included in the map information of the map database is stored in the map database with the road divided based on the points of intersection as illustrated in FIG. 3, the zones B1 to B3, which are sections of the road divided based on the points of intersection C1 to C4, are the objects of the map information update necessity determination. In this case, the map update determination system 200 performs the map information update necessity determination for each of the zones B1 to B3. In addition, the map update determination system 200 performs the map information update for each of the zones B1 to B3. The map information update by zone includes not only a case where the map information of the entire zone is updated but also a case where only the position information of a part such as the telephone pole is updated. The map update determination system 200 may determine the necessity of the map information update in any single one of the tile-shaped zones B1 to B3 as well.

The map database may have the map information stored in the map database as a hierarchical structure that consists of a plurality of layers. In this case, the map information is stored with the map information divided into, for example, a telephone pole layer that has the telephone pole position information, a curb layer that has the position information regarding the curb on the road, and a white line layer that has the position information regarding the white line in the road. By this hierarchical structure being adopted, the map update determination system 200 has only to search for the telephone pole layer when searching for the telephone pole position information, and thus, an increase in search efficiency may be achieved. In addition, the adoption of this hierarchical structure enables information to be updated by layer, and thus, a communication cost required for the update and the like may be reduced insofar as the layer requiring the update may be identified. The map database may have the position information regarding the telephone pole, the curb, and the white line stored in the map database as map information forming a group of data as well. In addition, the map database may perform the storage based on a route and navigation definition file [RNDF].

In a case where the automatic driving control for the vehicle M along the target route R has been carried out, the map update determination system 200 acquires a control result detection value regarding the vehicle M resulting from the automatic driving control. The map update determination system 200 acquires the control result detection value in association with the set longitudinal position on the target route R. The control result detection value is a detection value relating to a result of a control of the vehicle M based on the automatic driving control. The control result detection value is acquired in association with each of the set longitudinal positions on the target route R.

The control result detection value includes a control result lateral position of the vehicle and a control result vehicle speed of the vehicle. The control result lateral position is the lateral position of the vehicle as a control result of the automatic driving control. The control result lateral position is the lateral position of the vehicle during the automatic driving control that is detected at the set longitudinal position. The detection of the lateral position of the vehicle will be described in detail later. The control result vehicle speed is the vehicle speed of the vehicle as a control result of the automatic driving control. The control result vehicle speed is the vehicle speed of the vehicle during the automatic driving control that is detected at the set longitudinal position. The control result vehicle speed is detected by the in-vehicle vehicle speed sensor.

The map update determination system 200 calculates an evaluation value of the traveling plan based on a result of a comparison between the control target value of the traveling plan and the control result detection value resulting from the automatic driving control. The map update determination system 200 compares the control target value of the traveling plan and the control result detection value resulting from the automatic driving control to each other for each of the set longitudinal positions on the target route R. The evaluation value of the traveling plan is calculated as a value greater when the control target value of the traveling plan and the control result detection value resulting from the automatic driving control correspond to each other.

Figure 4:
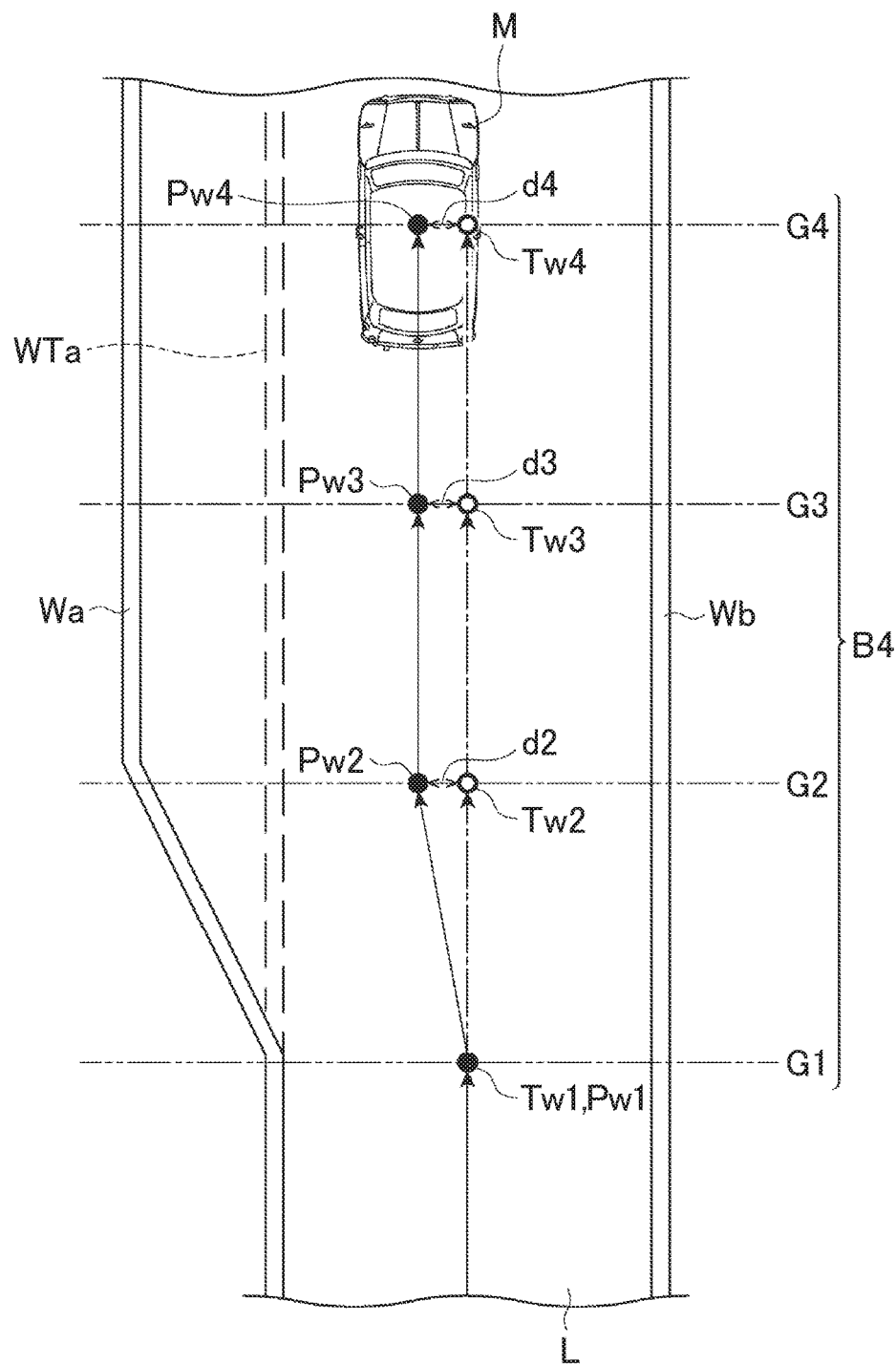
FIG. 4 is a plan view for showing a situation in which there is a difference between a target lateral position of a traveling plan and a control result lateral position resulting from an automatic driving control.

The calculation of the evaluation value of the traveling plan will be described with reference to FIG. 4. FIG. 4 is a plan view for showing a situation in which there is a difference between the target lateral position of the traveling plan and the control result lateral position resulting from the automatic driving control. A zone B4 that is the object of the map information update determination, a traveling lane L of the vehicle M, an actual white line Wa and an actual white line Wb of the traveling lane L, and a past white line WTa are illustrated in FIG. 4. The zone B4 is a zone that is stored in the map database in a similar storage format to the zones B1 to B3 illustrated in FIG. 3. Also illustrated in FIG. 4 are set longitudinal positions G1 to G4, target lateral positions Tw1 to Tw4 of the traveling plan, control result lateral positions Pw1 to Pw4, and differences d2 to d4 between the target lateral positions Tw2 to Tw4 and the control result lateral positions Pw2 to Pw4. The set longitudinal positions G1 to G4 are set on the target route R in this order and at predetermined intervals.

The target lateral position Tw1 illustrated in FIG. 4 is the target lateral position that corresponds to the set longitudinal position G1. The target lateral position Tw2 is the target lateral position that corresponds to the set longitudinal position G2. The target lateral position Tw3 is the target lateral position that corresponds to the set longitudinal position G3. The target lateral position Tw4 is the target lateral position that corresponds to the set longitudinal position G4. Likewise, the control result lateral position Pw1 is the control result lateral position that corresponds to the set longitudinal position G1. The control result lateral position Pw2 is the control result lateral position that corresponds to the set longitudinal position G2. The control result lateral position Pw3 is the control result lateral position that corresponds to the set longitudinal position G3. The control result lateral position Pw4 is the control result lateral position that corresponds to the set longitudinal position G4.

The difference d2 illustrated in FIG. 4 is a distance between the target lateral position Tw2 and the control result lateral position Pw2 in the lane width direction. The difference d3 is a distance between the target lateral position Tw3 and the control result lateral position Pw3 in the lane width direction. The difference d4 is a distance between the target lateral position Tw4 and the control result lateral position Pw4 in the lane width direction. The target lateral position Tw1 of the traveling plan and the control result lateral position Pw1 are the same position, and thus, have a difference of 0. The set longitudinal positions G1 to G4 are the only set longitudinal positions that are included in the zone B4.

In FIG. 4, the lane width of the traveling lane L has been expanded and the white line WTa has been changed to the white line Wa due to a road work. The white line WTa before the road work is a linear white line that extends in parallel to the white line Wb. The white line Wa after the change corresponds to the white line WTa up to the set longitudinal position G1 but becomes a white line extending in an oblique direction to become increasingly separated from the white line Wb as the white line Wa moves from the set longitudinal position G1 and the set longitudinal position G2. The white line Wa ahead of the set longitudinal position G2 is a linear white line that extends in parallel to the white line Wb. In the map database, the map information has yet to be updated and a combination of the white line WTa and the white line Wb before the road work is still stored as the white lines forming the traveling lane L.

The automatic driving system 100 generates the traveling plan such that traveling at central positions of the traveling lane L in the map information is performed. Accordingly, the target lateral positions Tw1 to Tw4 of the traveling plan in FIG. 4 are set at positions at the same distance from the white line WTa and the white line Wb in the lane width direction.

The automatic driving system 100 carries out the automatic driving control, based on the actual road environment recognized in the image captured by the in-vehicle camera or the like, such that the vehicle M travels at the actual central positions of the traveling lane L. Accordingly, the control result lateral positions Pw1 to Pw4 resulting from the automatic driving control are detected as positions at the same distance from the white line Wa and the white line Wb in the lane width direction.

In the situation that is illustrated in FIG. 4, the map update determination system 200 calculates the evaluation value of the traveling plan for the zone B4 based on a result of a comparison between the target lateral positions Tw1 to Tw4 of the traveling plan generated in dependence on the map information and the control result lateral positions Pw1 to Pw4 resulting from the automatic driving control carried out based on the actual road environment. The map update determination system 200 uses the differences d2 to d4 as the results of the comparison between the target lateral positions Tw1 to Tw4 and the control result lateral positions Pw1 to Pw4.

The map update determination system 200 calculates the evaluation value of the traveling plan for the zone B4 as a value that decreases as an average value of the differences d2 to d4 between the target lateral positions Tw1 to Tw4 and the control result lateral positions Pw1 to Pw4 increases. The map update determination system 200 may calculate a reciprocal number of the average value of the differences d2 to d4 as the evaluation value of the traveling plan for the zone B4 as well.

The map update determination system 200 may also use a median value, a sum total, a maximum value, or a minimum value of the differences d2 to d4 instead of the average value of the differences d2 to d4. In addition, the map update determination system 200 may calculate the evaluation value of the traveling plan by using a predetermined arithmetic expression in which the differences d2 to d4 are inputs. The map update determination system 200 calculates the evaluation value of the traveling plan for the zone as described above.

The map update determination system 200 determines the necessity of the update of the map information in the zone based on the calculated evaluation value of the traveling plan and an evaluation threshold. The evaluation threshold is a value that is set in advance. In a case where the evaluation value of the traveling plan for the zone falls short of the evaluation threshold, the map update determination system 200 determines that the map information on the zone needs to be updated.

In a case where it is determined that the map information needs to be updated, the map update determination system 200 transmits information relating to the zone subjected to the determination that the map information needs to be updated by communication to a server in a map information management center. The map information management center is a facility for managing the map information of multiple vehicles in communication with each other. In the map information management center, acquisition of latest map information is performed, by the probe car being used, for the zone subjected to the determination that the map information needs to be updated. The map update determination system 200 updates the map information of the in-vehicle map database by communicating with the map information management center and by using the latest map information of the map information management center.

<Configuration of Automatic Driving System (Map Update Determination System)>

As illustrated in FIG. 1, the automatic driving system 100 according to a non-limiting embodiment is provided with an ECU 10 for carrying out the automatic driving control. The ECU 10 is an electronic control unit that has a central processing unit [CPU], a read-only memory [ROM], a random access memory [RAM], a controller area network [CAN] communication circuit, and the like. Various functions are realized in the ECU 10 by a program stored in the ROM being loaded into the RAM and the program loaded into the RAM being executed by the CPU. A plurality of the electronic control units may constitute the ECU 10 as well. A GPS receiving unit 1, an external sensor 2, an internal sensor 3, a map database 4, a navigation system 5, an actuator 6, and a communication unit 7 are connected to the ECU 10 via the CAN communication circuit.

The GPS receiving unit 1 is mounted in the vehicle M and functions as a position measurement unit that measures the position of the vehicle M. The GPS receiving unit 1 measures the position of the vehicle M (such as a latitude and a longitude of the vehicle M) by receiving signals from three or more GPS satellites. The GPS receiving unit 1 transmits information on the measured position of the vehicle M to the ECU 10.

The external sensor 2 is a detection instrument for detecting an obstacle in the vicinity of the vehicle M and the like. The external sensor 2 includes at least one of cameras, a radar, and a laser imaging detection and ranging [lidar]. The external sensor 2 is used for recognition of the white line of the traveling lane in which the vehicle M travels (described later), too. In addition, the external sensor 2 may be used for the measurement of the position of the vehicle M.

The camera is an imaging instrument that images an external situation of the vehicle. The cameras are disposed on a back side of a windshield of the vehicle M and a back surface of the vehicle. The cameras may be disposed on right and left side surfaces of the vehicle M. The cameras transmit imaging information to the ECU 10, the imaging information being obtained by spaces in front of and behind the vehicle M being imaged. The camera may be a monocular camera or a stereo camera. The stereo camera has two imaging units that are placed to reproduce a binocular disparity. The imaging information of the stereo camera includes depth-direction information.

The radar detects the obstacle in the vicinity of the vehicle M by using radio waves (such as millimeter waves). The radar detects the obstacle by transmitting the radio waves to the vicinity of the vehicle M and receiving the radio waves reflected by the obstacle. The radar transmits information on the detected obstacle to the ECU 10. The obstacle includes a dynamic obstacle, such as a bicycle and another vehicle, as well as the fixed obstacles described above.

The lidar detects the obstacle outside the vehicle M by using light. The lidar detects the obstacle by transmitting the light to the vicinity of the vehicle M, receiving the light reflected by the obstacle, and measuring a distance to a reflection point. The lidar transmits information on the detected obstacle to the ECU 10. The lidar and the radar do not necessarily have to be provided along with each other.

The internal sensor 3 is a detection instrument that detects the traveling state of the vehicle M. The internal sensor 3 includes the vehicle speed sensor, an acceleration sensor, and a yaw rate sensor. The vehicle speed sensor is a detector that detects the speed of the vehicle M. A vehicle wheel speed sensor is used as the vehicle speed sensor. The vehicle wheel speed sensor is disposed with respect to a vehicle wheel of the vehicle M, a drive shaft rotating integrally with the vehicle wheel, or the like and detects a rotation speed of the vehicle wheel. The vehicle speed sensor transmits information on the detected vehicle speed to the ECU 10.

The acceleration sensor is a detector that detects the acceleration of the vehicle M. The acceleration sensor includes a longitudinal acceleration sensor that detects a longitudinal acceleration of the vehicle and a lateral acceleration sensor that detects a lateral acceleration of the vehicle M. The acceleration sensor transmits acceleration information regarding the vehicle M to the ECU 10. The yaw rate sensor is a detector that detects the yaw rate (rotation angular velocity) about a vertical axis of the center of gravity of the vehicle M. A gyro sensor may be used as the yaw rate sensor. The yaw rate sensor transmits information on the detected yaw rate of the vehicle M to the ECU 10.

The internal sensor 3 may include a steering angle sensor. The steering angle sensor is a sensor that detects a steering angle (actual steering angle) of the vehicle M. The steering angle sensor is disposed with respect to a steering shaft of the vehicle M. The steering angle sensor transmits information on the detected steering angle to the ECU 10.

The map database 4 is a map information storage database. The map database 4 is formed in a hard disk drive [HDD] that is mounted in the vehicle M. The map database 4 may be connected to the server in the map information management center by wireless communication via the communication unit 7. The map database 4 updates the map information on a regular basis by using the latest map information stored in the server in the map information management center. The map database 4 has the map information stored for each of the zones described above.

The map database 4 constitutes the map update determination system 200 with a traveling plan generation unit 14, a detection value acquisition unit 16, an evaluation value calculation unit 17, and a map update determination unit 18 (described later). The map database 4 does not necessarily have to be mounted in the vehicle M. The map database 4 may be disposed in, for example, a server that is capable of communicating with the vehicle M.

The navigation system 5 is mounted in the vehicle M and sets the target route R along which the vehicle M travels as a result of the automatic driving control. The navigation system 5 calculates the target route R from the position of the vehicle M to the destination E based on the destination E set in advance, the position of the vehicle M measured by the GPS receiving unit 1, and the map information of the map database 4. The destination E of the automatic driving control is set by an occupant in the vehicle M operating an input button (or a touch panel) that the navigation system 5 is provided with. The target route R is set with the lanes constituting the road divided. The navigation system 5 may set the target route R by using a known technique. The navigation system 5 may have a function to perform guidance along the target route R at a time of manual driving of the vehicle M by the driver. The navigation system 5 outputs information regarding the target route R of the vehicle M to the ECU 10. Some of functions of the navigation system 5 may be executed by a server in a facility such as an information processing center that is capable of communicating with the vehicle M. The functions of the navigation system 5 may be executed in the ECU 10 as well.

Herein, the target route R includes a target route that is automatically generated based on a past destination history and map information when no explicit destination setting has been performed by a driver, examples of which include a traveling route along a road according to the "DRIVING SUPPORT DEVICE" disclosed in Japanese Patent No. 5382218 (WO2011/158347) or the "AUTOMATIC DRIVING DEVICE" disclosed in Japanese Patent Application Publication No. 2011-162132 (JP 2011-162132 A).

The actuator 6 is a device that executes a traveling control for the vehicle M. The actuator 6 includes at least a throttle actuator, a brake actuator, and a steering actuator. The throttle actuator controls the amount of air supply to an engine (throttle opening degree) in response to a control signal from the ECU 10 to control a driving force of the vehicle M. In a case where the vehicle M is a hybrid car, the driving force is controlled with the control signal from the ECU 10 being input to a motor as a power source in addition to the amount of the air supply to the engine. In a case where the vehicle M is an electric car, the driving force is controlled with the control signal from the ECU 10 being input to a motor as a power source. The motors as the power sources in these cases constitute the actuator 6.

The brake actuator controls a brake system in response to the control signal from the ECU 10 to control a braking force that is given to the vehicle wheel of the vehicle M. A hydraulic brake system may be used as the brake system. The steering actuator controls, in response to the control signal from the ECU 10, driving of a steering torque-controlling assist motor of an electric power steering system. In this manner, the steering actuator controls a steering torque of the vehicle M.

The communication unit 7 is mounted in the vehicle M and performs wireless communication. The communication unit 7 performs the wireless communication with the server in the map information management center or the like that manages the map information. The communication unit 7 may perform inter-vehicle communication with another vehicle that is capable of the inter-vehicle communication, too. In addition, the communication unit 7 may perform road-to-vehicle communication with a roadside transceiver that is disposed along the road.

Hereinafter, a functional configuration of the ECU 10 will be described. The ECU 10 has a vehicle position recognition unit 11, a road environment recognition unit 12, a traveling state recognition unit 13, the traveling plan generation unit 14, a traveling control unit 15, the detection value acquisition unit 16, the evaluation value calculation unit 17, and the map update determination unit 18. Some of functions of the ECU 10 may be executed by the server that is capable of communicating with the vehicle M.

The vehicle position recognition unit 11 recognizes the position of the vehicle M on the map based on the position information of the GPS receiving unit 1 and the map information of the map database 4. The vehicle position recognition unit 11 recognizes the position of the vehicle M as a combination of an x-coordinate and a y-coordinate in an xy-orthogonal coordinate system in which the position of the vehicle M at a time of the initiation of the automatic driving control is a reference. The vehicle position recognition unit 11 may also recognize the position of the vehicle M by using the position information regarding the fixed obstacle, such as the telephone pole, included in the map information of the map database 4, a result of the detection by the external sensor 2, and the SLAM technology. In this case, the external sensor 2 functions as the position measurement unit instead of the GPS receiving unit 1.

A central position of the vehicle M in a case where the vehicle M is seen in a vertical direction (in the case of a plan view) may be the reference of the position of the vehicle M. The central position of the vehicle M is a position at the center of the vehicle M in a vehicle width direction and the center of the vehicle M in a longitudinal direction.

The vehicle position recognition unit 11 also recognizes the longitudinal position of the vehicle M and the lateral position of the vehicle. In a case where the map information includes the white line position information, the vehicle position recognition unit 11 recognizes the longitudinal position of the vehicle M and the lateral position of the vehicle M by using the position of the vehicle M in the xy-orthogonal coordinate system and the position information regarding the white line of the traveling lane in which the vehicle M travels (coordinate information). The vehicle position recognition unit 11 calculates, by using a known calculation processing technique, the longitudinal position of the vehicle in a direction in which the traveling lane extends and the lateral position of the vehicle M in the traveling lane width direction.

The vehicle position recognition unit 11 may recognize the lateral position of the vehicle M by using a known image processing technique and based on an image of the space in front of the vehicle (white line image) captured by the in-vehicle camera. The in-vehicle camera has a pre-determined mounting position in the vehicle M, and an imaging range of the camera from that mounting position is also determined in advance. Also determined in advance is a positional relationship (positional relationship in a plan view) between the camera mounting position and the central position of the vehicle M. Accordingly, the vehicle position recognition unit 11 is capable of obtaining the central position of the vehicle M (lateral position of the vehicle M) in the lane width direction from the positions of the two, right and left, white lines on the image captured by the camera. In addition, the vehicle position recognition unit 11 may recognize the lateral position of the vehicle M as the amount of a deviation (a deviation amount) of the central position of the vehicle M with respect to a lane center (position at the same distance from the two, right and left, white lines).

The vehicle position recognition unit 11 may also recognize the lateral position of the vehicle M by using white line detection by not the camera but the lidar. The lidar also has a pre-determined mounting position in the vehicle M, and a detection range of the lidar from that mounting position is also determined in advance. Also determined in advance is a positional relationship (positional relationship in a plan view) between the lidar mounting position and the central position of the vehicle M. Accordingly, the vehicle position recognition unit 11 is capable of obtaining the lateral position of the vehicle M from the positions of the two, right and left, white lines detected by the lidar.

The reference of the position of the vehicle M may be a center-of-gravity position of the vehicle M (center-of-gravity position of the vehicle M at a time of design) in a case where the vehicle M is seen in the vertical direction instead of the central position of the vehicle M. Because a positional relationship between the center-of-gravity position of the vehicle M at the time of the design and the central position of the vehicle M described above is pre-determined, the vehicle position recognition unit 11 is capable of recognizing the lateral position of the vehicle M with respect to the center-of-gravity position of the vehicle M as the reference as is the case with the central position of the vehicle M.

The road environment recognition unit 12 recognizes the road environment in the vicinity of the vehicle M based on the result of the detection by the external sensor 2. The road environment recognition unit 12 recognizes the road environment in the vicinity of the vehicle M by using a known technique and based on the image captured by the camera, the obstacle information of the radar, or the obstacle information of the lidar. The road environment recognition unit 12 recognizes the position of the white line of the traveling lane in which the vehicle M travels based on the imaging information of the camera or the obstacle information of the lidar. The road environment recognition unit 12 may also recognize the line type of the white line and a curvature of the white line. The road environment recognition unit 12 recognizes the fixed obstacle around the vehicle M based on the imaging information of the camera, the obstacle information of the lidar, or the obstacle information of the radar.

The traveling state recognition unit 13 recognizes the traveling state of the vehicle M, which includes the vehicle speed and a direction of the vehicle M, based on a result of the detection by the internal sensor 3. Specifically, the traveling state recognition unit 13 recognizes the vehicle speed of the vehicle M based on the vehicle speed information of the vehicle speed sensor. The traveling state recognition unit 13 recognizes the direction of the vehicle M based on the yaw rate information of the yaw rate sensor.

The traveling plan generation unit 14 generates the traveling plan of the vehicle M based on the target route R set by the navigation system 5 and the map information of the map database 4. In a case where the automatic driving control initiation operation is performed by the driver, the traveling plan generation unit 14 initiates the generation of the traveling plan. This traveling plan is a traveling plan that continues until the vehicle M reaches the destination E set in advance from the current position of the vehicle M. This traveling plan is generated in dependence on the map information.

The traveling plan generation unit 14 generates the traveling plan by setting the set longitudinal positions on the target route R at the predetermined intervals (such as 1 m) and setting the control target value (such as the target lateral position and the target vehicle speed) for each of the set longitudinal positions. In other words, the traveling plan includes the control target values depending on the set longitudinal positions on the target route R. The set longitudinal position and the target lateral position may be set as a single positional coordinate along with each other. The set longitudinal position and the target lateral position mean longitudinal position information and lateral position information that are set as targets in the traveling plan.

The generation of the traveling plan will be described in detail with reference to FIG. 4. In a case where the automatic driving control initiation operation is performed by the driver in a situation in which the vehicle M is positioned a predetermined distance (hundreds of meters or several kilometers) ahead of the set longitudinal position G1 illustrated in FIG. 4, the traveling plan generation unit 14 generates, based on the map information, the traveling plan including the control target values depending on the set longitudinal positions G1 to G4. The traveling plan generation unit 14 generates the traveling plan for traveling at the central position of the traveling lane L in the lane width direction. Since the map information of the map database 4 has yet to be updated, the traveling plan generation unit 14 generates the traveling plan based on outdated map information (map information in which the white line WTa and the white line Wb before the road work are stored). In other words, the traveling plan generation unit 14 generates the traveling plan for traveling of the vehicle M at the target lateral positions Tw1 to Tw4, which are positions at the same distance from the white line WTa and the white line Wb.

In addition, the traveling plan generation unit 14 generates a short-term traveling plan responding to the actual road environment apart from the traveling plan depending on the map information. The short-term traveling plan is generated as a plan for traveling of the vehicle M within a detection range of the external sensor 2 (such as a range of 150 m or less in front of the vehicle M).

The short-term traveling plan has a short-term control target value depending on the set longitudinal position on the target route R as is the case with the traveling plan. The short-term control target value is a control target value for the vehicle M in the short-term traveling plan. The short-term control target value is set in association with each of the set longitudinal positions on the target route R. The short-term control target value includes a short-term target lateral position of the vehicle M and a short-term target vehicle speed of the vehicle M. The short-term target lateral position is a control target lateral position of the vehicle M in the short-term traveling plan. The short-term target vehicle speed is a control target vehicle speed of the vehicle M in the short-term traveling plan.

The traveling plan generation unit 14 generates the short-term traveling plan based on the road environment in the vicinity of the vehicle M recognized by the road environment recognition unit 12, the traveling state of the vehicle M recognized by the traveling state recognition unit 13, the position of the vehicle M recognized by the vehicle position recognition unit 11, and the traveling plan (traveling plan continuing to the destination E from the current position of the vehicle M).

In a case where the map information has an error, the traveling plan generation unit 14 may adopt the control target value of the traveling plan as the short-term control target value of the short-term traveling plan. In a case where the vehicle M is traveling at a lateral position deviating from the traveling plan (lateral position deviating from the central position of the lane), the traveling plan generation unit 14 generates the short-term traveling plan such that the vehicle M returns to the central position of the lane from the current position of the vehicle M. The generation of the short-term traveling plan described above may be realized with reference to Japanese Patent Application Publication No. 2009-291540 (JP 2009-291540 A).

The generation of the short-term traveling plan will be described in detail with reference to FIG. 4. In a case where the set longitudinal positions G1 to G4 are included in the detection range of the external sensor 2 with the vehicle M traveling, the traveling plan generation unit 14 generates the short-term traveling plan including the short-term control target values depending on the set longitudinal positions G1 to G4. The traveling plan generation unit 14 generates the short-term traveling plan for traveling at the central position of the traveling lane L in the lane width direction. The traveling plan generation unit 14 generates, based on the road environment in the vicinity of the vehicle M, the short-term traveling plan for traveling of the vehicle M at the position at the same distance from the actual white line Wa and white line Wb. In this case, the short-term target lateral positions of the short-term traveling plan that correspond to the set longitudinal positions G1 to G4 are set at the same positions as the control result lateral positions Pw1 to Pw4, respectively.

As illustrated in FIG. 1, the traveling plan generation unit 14 constitutes the map update determination system 200 with the map database 4, the detection value acquisition unit 16, the evaluation value calculation unit 17, and the map update determination unit 18.

The traveling control unit 15 carries out the automatic driving control for the vehicle M based on the short-term traveling plan generated by the traveling plan generation unit 14. In other words, the traveling control unit 15 carries out the automatic driving control based on the road environment in the vicinity of the vehicle M, the traveling state of the vehicle M, the position of the vehicle M, and the short-term traveling plan generated from the traveling plan.

The traveling control unit 15 calculates a command control value based on the short-term traveling plan such that the lateral position of the vehicle M and the vehicle speed of the vehicle M become the target lateral position and the target vehicle speed of the short-term traveling plan at the set longitudinal position. The traveling control unit 15 outputs the calculated command control value to the actuator 6. The traveling control unit 15 carries out the automatic driving control for the vehicle M by controlling an output of the actuator 6 (such as the driving force, the braking force, and the steering torque) with the command control value. The traveling control unit 15 carries out the automatic driving control in response to the actual road environment based on the short-term traveling plan.

Specifically, the traveling control unit 15 carries out the automatic driving control such that the vehicle M passes through the control result lateral positions Pw1 to Pw4 in the traveling lane L illustrated in FIG. 4 based on the short-term traveling plan.

In a case where the automatic driving control for the vehicle M is being performed, the detection value acquisition unit 16 acquires the control result detection value regarding the vehicle M resulting from the automatic driving control. The detection value acquisition unit 16 acquires the control result detection value in association with the set longitudinal position on the target route R. As described above, the control result detection value includes the control result vehicle speed and the control result lateral position.

The detection value acquisition unit 16 calculates the vehicle speed of the vehicle M that is associated with the longitudinal position of the vehicle M based on the longitudinal position of the vehicle M recognized by the vehicle position recognition unit 11 and the vehicle speed information of the vehicle speed sensor. The detection value acquisition unit 16 acquires the control result vehicle speed of the vehicle M that is associated with each of the set longitudinal positions based on the vehicle speed of the vehicle M that is associated with the longitudinal position of the vehicle M. The control result vehicle speed of the vehicle M that is associated with the set longitudinal position does not have to be the vehicle speed at a time when the longitudinal position of the vehicle M corresponds to the set longitudinal position. The detection value acquisition unit 16 may acquire the vehicle speed at a time when the longitudinal position of the vehicle M is the closest to the set longitudinal position as the control result vehicle speed of the vehicle M associated with that set longitudinal position among the vehicle speeds of the vehicle M periodically detected by the vehicle speed sensor.

Likewise, the detection value acquisition unit 16 acquires the control result lateral position of the vehicle M that is associated with each of the set longitudinal positions based on the longitudinal position of the vehicle M and the lateral position of the vehicle M recognized by the vehicle position recognition unit 11. The control result lateral position of the vehicle M that is associated with the set longitudinal position does not have to be the lateral position of the vehicle M at a time when the longitudinal position of the vehicle M corresponds to the set longitudinal position. The detection value acquisition unit 16 may acquire the lateral position at a time when the longitudinal position of the vehicle M is the closest to the set longitudinal position as the control result lateral position of the vehicle M associated with that set longitudinal position among the lateral positions of the vehicle M periodically recognized by the vehicle position recognition unit 11.

Specifically, the detection value acquisition unit 16 acquires the control result lateral positions Pw1 to Pw4 through which the vehicle M has actually traveled in the traveling lane L illustrated in FIG. 4 for each of the set longitudinal positions G1 to G4. The control result lateral positions Pw1 to Pw4 are acquired as data that may be compared to the target lateral positions Tw1 to Tw4 in the traveling plan. The control result lateral positions Pw1 to Pw4 associated with the set longitudinal positions G1 to G4 are acquired as coordinate values in the xy-orthogonal coordinate system described above.

The evaluation value calculation unit 17 calculates the evaluation value of the traveling plan for the zone that is the object of the map information update determination. Tile-shaped zones such as the zones B1 to B3 that are illustrated in FIG. 3 may be adopted as the zones. The evaluation value calculation unit 17 calculates the evaluation value of the traveling plan for the zone based on the result of the comparison between the control target value of the traveling plan generated by the traveling plan generation unit 14 and the control result detection value acquired by the detection value acquisition unit 16. The evaluation value calculation unit 17 compares the control target value and the control result detection value that are associated with the same set longitudinal position to each other. The evaluation value calculation unit 17 performs the comparison between the control target value and the control result detection value for each of the set longitudinal positions that are present in the zone and calculates the evaluation value of the traveling plan for the zone based on results of the comparison.

The evaluation value calculation unit 17 may perform a comparison between the target vehicle speed and the control result vehicle speed as the comparison between the control target value and the control result detection value. In a case where a temporary stop line that is not included in the map information, which is stored in the map database 4, is present in front of the vehicle M, the vehicle M decelerates once the temporary stop line is detected, and thus, the target vehicle speed of the traveling plan depending on the map information and the control result vehicle speed resulting from the automatic driving control responding to the actual road environment becomes different in value from each other. The evaluation value calculation unit 17 uses the difference between the target vehicle speed and the control result vehicle speed as a result of the comparison between the target vehicle speed and the control result vehicle speed. The evaluation value calculation unit 17 calculates the difference (absolute value) between the target vehicle speed and the control result vehicle speed for each of the set longitudinal positions included in the zone. The evaluation value calculation unit 17 calculates the evaluation value of the traveling plan for the zone as a value that decreases as an average value of the differences at the respective set longitudinal positions included in the zone increases. The evaluation value calculation unit 17 may also calculate a reciprocal number of the average value of the differences at the respective set longitudinal positions included in the zone as the evaluation value of the traveling plan for the zone. The evaluation value calculation unit 17 may also use a median value, a sum total, a maximum value, or a minimum value of the differences instead of the average value of the differences. The evaluation value calculation unit 17 calculates the evaluation value of the traveling plan relating to the vehicle speed calculated from the result of the comparison between the target vehicle speed and the control result vehicle speed.

The evaluation value calculation unit 17 may perform a comparison between the target lateral position and the control result lateral position as the comparison between the control target value and the control result detection value. The comparison between the target lateral position and the control result lateral position with reference to FIG. 4 is as described above, and thus, description thereof will be omitted herein. The evaluation value calculation unit 17 calculates the evaluation value of the traveling plan relating to the lateral position calculated from a result of the comparison between the target lateral position and the control result lateral position.

The map update determination unit 18 sets the evaluation threshold for the zone that is used for the map information update determination based on a position of the zone in the map information. The map update determination unit 18 recognizes the zone through which the target route R passes based on the map information and the target route R.

The map update determination unit 18 determines whether the zone is a zone in an urban area or a suburban zone based on the position of the zone in the map information. The map information includes data by zone indicating whether the zone is the zone in the urban area or the suburban zone. The map update determination unit 18 sets the evaluation threshold for the zone in the urban area to be higher than the evaluation threshold for the suburban zone in that the zone in the urban area requires a higher level of map information accuracy in relation to the automatic driving control than the suburban zone.

In addition, the map update determination unit 18 may determine whether the zone is a zone in a general road or a zone in a limited-access road based on the position of the zone in the map information and the target route R. The map information includes data by road (or for individual roads) indicating whether the road is the limited-access road or not. Herein, the road that is not the limited-access road will be referred to as the general road. The map update determination unit 18 sets the evaluation threshold for the zone in the general road to be higher than the evaluation threshold for the zone in the limited-access road in that the general road requires a higher level of map information accuracy in relation to the automatic driving control than the limited-access road.

Furthermore, the map update determination unit 18 may determine whether the zone is a zone in a private road or not. In this case, the map information includes data by road (or for individual roads) indicating whether the road is the private road or not. The map update determination unit 18 sets the evaluation threshold for the zone in the private road to be higher than the evaluation threshold for the zone in the general road in that the private road, which is smaller in road width than the general road in many cases, requires a higher level of map information accuracy in relation to the automatic driving control than the general road.

Moreover, the map update determination unit 18 sets each of an evaluation threshold relating to the vehicle speed and an evaluation threshold relating to the lateral position based on the position of the zone in the map information.

The map update determination unit 18 determines the necessity of the update of the map information in the zone based on the evaluation value of the traveling plan calculated by the evaluation value calculation unit 17 and the evaluation threshold. The map update determination unit 18 determines whether or not the evaluation value of the traveling plan for the zone falls short of the evaluation threshold for the zone. In a case where the evaluation value of the traveling plan for the zone falls short of the evaluation threshold for the zone, the map update determination unit 18 determines that the update of the map information is necessary in the zone.

The map update determination unit 18 determines that the evaluation value of the traveling plan for the zone falls short of the evaluation threshold in a case where the evaluation value of the traveling plan for the zone relating to the vehicle speed falls short of the evaluation threshold for the zone relating to the vehicle speed or in a case where the evaluation value of the traveling plan for the zone relating to the lateral position falls short of the evaluation threshold for the zone relating to the lateral position. The map update determination unit 18 may also determine that the update of the map information is necessary in the zone only in a case where the evaluation value of the traveling plan for the zone relating to the vehicle speed falls short of the evaluation threshold for the zone relating to the vehicle speed and the evaluation value of the traveling plan for the zone relating to the lateral position falls short of the evaluation threshold for the zone relating to the lateral position.

The map update determination unit 18 may not determine the necessity of the map information update in a case where the dynamic obstacle that affects the automatic driving control is present around the vehicle M. In this case, the dynamic obstacle is the bicycle, a pedestrian, an animal, another vehicle, or the like. The map update determination unit 18 determines, based on the road environment in the vicinity of the vehicle M recognized by the road environment recognition unit 12, whether or not the dynamic obstacle is present within a predetermined distance (for example, within a distance of 1 m) from a target trajectory of the vehicle M in the traveling plan (trajectory passing through a position identified from the set longitudinal position and the target lateral position associated with each other). In a case where it is determined that the dynamic obstacle is present within the predetermined distance from the target trajectory of the vehicle M, the map update determination unit 18 may exclude the zone where the determination is performed from the object of the map information update necessity determination. The map update determination unit 18 may also exclude the zone where the determination is performed from the object of the map information update necessity determination in a case where it is determined that the dynamic obstacle is present in front of the vehicle M.

<Traveling Plan Generation Processing of Automatic Driving System>

Figure 5A:
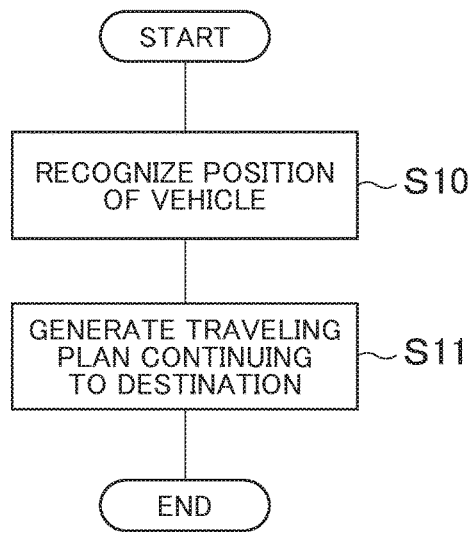
FIG. 5A is a flowchart illustrating a traveling plan generation processing.

Hereinafter, a traveling plan generation processing of the automatic driving system 100 according to the first embodiment will be described with reference to FIG. 5A. FIG. 5A is a flowchart illustrating the traveling plan generation processing. The flowchart that is illustrated in FIG. 5A is executed in a case where the automatic driving control initiation operation is performed by the driver.

As illustrated in FIG. 5A, the automatic driving system 100 recognizes the position of the vehicle M in S10 by using the vehicle position recognition unit 11. The vehicle position recognition unit 11 recognizes the position of the vehicle M on the map based on the position information of the GPS receiving unit 1 and the map information of the map database 4. The vehicle position recognition unit 11 may recognize the position of the vehicle by using the result of the detection by the external sensor 2 and the SLAM technology as well.

Then, in S11, the automatic driving system 100 generates the traveling plan by using the traveling plan generation unit 14. The traveling plan generation unit 14 generates the traveling plan for causing the vehicle M to travel along the target route R based on the position of the vehicle M recognized by the vehicle position recognition unit 11 and the target route R set in advance by the navigation system 5. The traveling plan generation unit 14 generates the traveling plan continuing to the destination E from the current position of the vehicle M.

In a case where the traveling plan has been generated on the map information, the automatic driving system 100 terminates the current traveling plan generation processing. Then, the automatic driving system 100 initiates the traveling plan generation processing again in a case where the driver changes the target route R.

<Automatic Driving Control of Automatic Driving System>

Figure 5B:
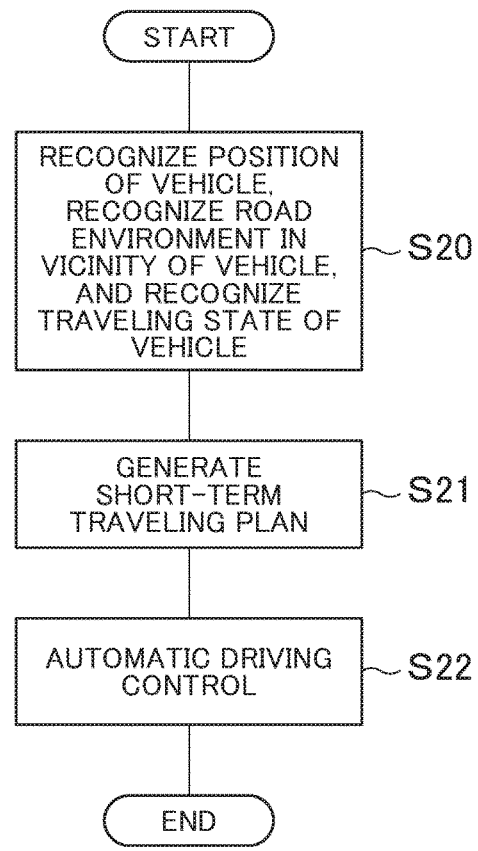
FIG. 5B is a flowchart illustrating the automatic driving control.

Hereinafter, the automatic driving control of the automatic driving system 100 according to the first embodiment will be described with reference to FIG. 5B. FIG. 5B is a flowchart illustrating the automatic driving control. The flowchart that is illustrated in FIG. 5B is executed in a case where the traveling plan has been generated with the automatic driving control initiation operation performed by the driver.

As illustrated in FIG. 5B, the automatic driving system 100 recognizes the position of the vehicle M in S20 by using the vehicle position recognition unit 11. The vehicle position recognition unit 11 recognizes the position of the vehicle M based on the position information of the GPS receiving unit 1 and the map information of the map database 4. The vehicle position recognition unit 11 may recognize the position of the vehicle by using the SLAM technology as well. In addition, the vehicle position recognition unit 11 may estimate the position of the vehicle from a history of a change in the vehicle speed of the vehicle M and a history of a change in the direction of the vehicle M based on the vehicle speed information of the vehicle speed sensor and the yaw rate information of the yaw rate sensor.

In S20, the automatic driving system 100 recognizes the road environment in the vicinity of the vehicle M by using the road environment recognition unit 12. The road environment recognition unit 12 recognizes the position of the white line of the traveling lane and the road environment in the vicinity of the vehicle M based on the result of the detection by the external sensor 2. In addition, the automatic driving system 100 recognizes the traveling state of the vehicle M in S20 by using the traveling state recognition unit 13. The traveling state recognition unit 13 recognizes the vehicle speed of the vehicle M based on the vehicle speed information of the vehicle speed sensor and recognizes the direction of the vehicle M based on the yaw rate information of the yaw rate sensor.

Then, in S21, the automatic driving system 100 generates the short-term traveling plan by using the traveling plan generation unit 14. The traveling plan generation unit 14 generates the short-term traveling plan based on the position of the vehicle M, the road environment in the vicinity of the vehicle M, the traveling state of the vehicle M, and the traveling plan. The traveling plan generation unit 14 generates the short-term traveling plan responding to the actual road environment. The traveling plan generation unit 14 generates the short-term traveling plan as a plan for traveling of the vehicle M in the detection range of the external sensor 2.

Then, in S22, the automatic driving system 100 carries out the automatic driving control for the vehicle M by using the traveling control unit 15. The traveling control unit 15 carries out the automatic driving control for causing the vehicle M to travel in accordance with the actual road environment based on the short-term traveling plan. The traveling control unit 15 carries out the automatic driving control for the vehicle M by controlling the output of the actuator 6 with the command control value.

Then, the automatic driving system 100 repeats the processing starting from S20 in a case where the automatic driving control for the vehicle M is in progress. In a case where the automatic driving control has been terminated or discontinued, the automatic driving system 100 terminates the automatic driving control processing even if the automatic driving control processing is in progress.

<Control Result Detection Value Acquisition Processing of Map Update Determination System>

Figure 6:
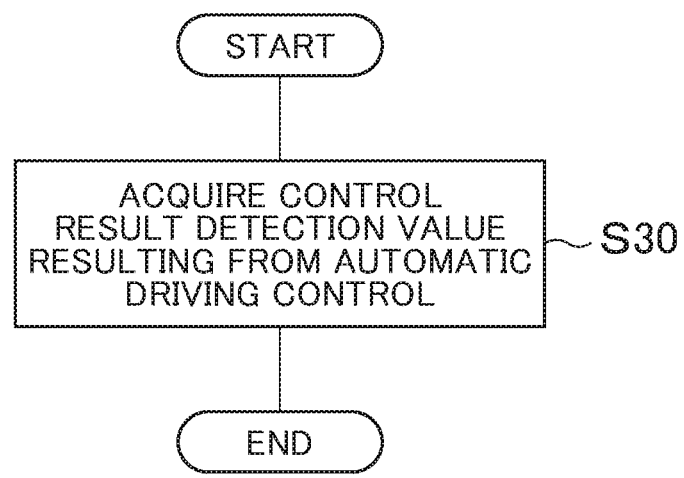
FIG. 6 is a flowchart illustrating a control result detection value acquisition processing.

Hereinafter, a control result detection value acquisition processing of the map update determination system 200 according to the first embodiment will be described. FIG. 6 is a flowchart illustrating the control result detection value acquisition processing. The flowchart that is illustrated in FIG. 6 is executed in a case where the automatic driving control for the vehicle M is initiated.

As illustrated in FIG. 6, the map update determination system 200 acquires the control result detection value in S30 by using the detection value acquisition unit 16. The detection value acquisition unit 16 acquires the control result detection value in association with the set longitudinal position on the target route R. The detection value acquisition unit 16 acquires the control result vehicle speed of the vehicle M associated with each of the set longitudinal positions based on the longitudinal position of the vehicle M recognized by the vehicle position recognition unit 11 and the vehicle speed information of the vehicle speed sensor. The detection value acquisition unit 16 acquires the control result lateral position of the vehicle M associated with each of the set longitudinal positions based on the longitudinal position of the vehicle M and the lateral position of the vehicle M recognized by the vehicle position recognition unit 11.

The detection value acquisition unit 16 acquires the control result detection value in a case where the longitudinal position of the vehicle M has reached the set longitudinal position. The detection value acquisition unit 16 may also collectively acquire the control result detection value by set longitudinal position from data regarding a past position (longitudinal position and lateral position) of the vehicle M and data regarding a past vehicle speed of the vehicle M (data regarding the vehicle speed associated with the longitudinal position). The detection value acquisition unit 16 terminates the current acquisition processing in a case where the control result detection values associated with all the set longitudinal positions through which the vehicle M has passed during the automatic driving control have been acquired.

The detection value acquisition unit 16 does not necessarily have to execute the acquisition processing during the automatic driving control for the vehicle M. In a case where the control result detection value is acquired based on past data regarding the vehicle M, the detection value acquisition unit 16 may initiate the acquisition processing when the vehicle M is in a stationary state or a parking state. Then, the acquisition processing may be executed when there is room for a calculation processing capacity of the ECU 10. The detection value acquisition unit 16 may collectively execute the acquisition processing for the control result detection values over a predetermined period of time (such as one day).

<Map Update Determination Processing of Map Update Determination System>

Figure 7:
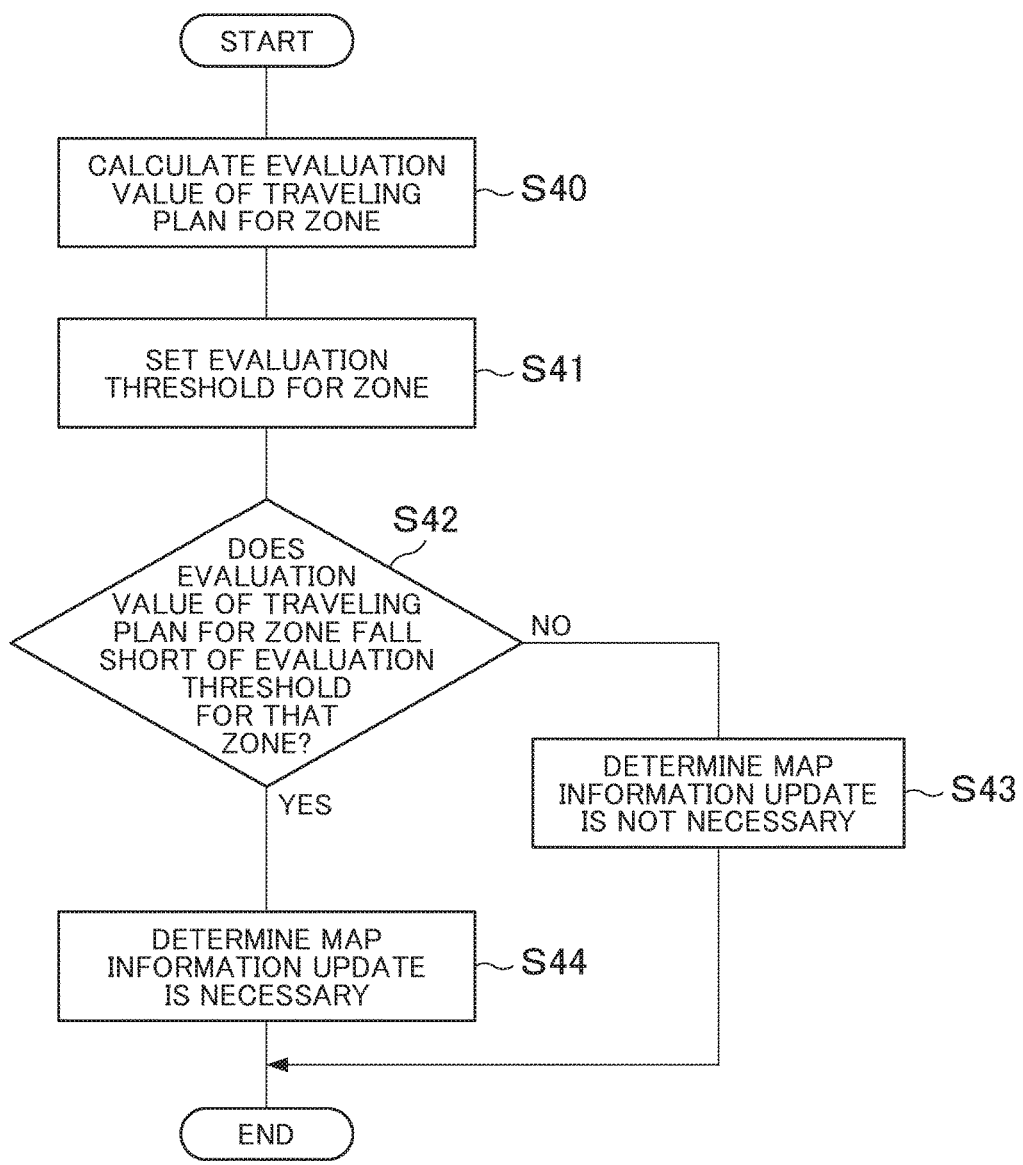
FIG. 7 is a flowchart illustrating a map update determination processing.

Hereinafter, a map update determination processing of the map update determination system 200 according to the first embodiment will be described. FIG. 7 is a flowchart illustrating the map update determination processing. The flowchart that is illustrated in FIG. 7 is initiated in a case where the control result target value acquisition processing that is illustrated in FIG. 6 is terminated in the zone.

As illustrated in FIG. 7, the map update determination system 200 calculates the evaluation value of the traveling plan for the zone in S40 by using the evaluation value calculation unit 17. The evaluation value calculation unit 17 calculates the evaluation value of the traveling plan for the zone based on the result of the comparison between the control target value of the traveling plan generated by the traveling plan generation unit 14 and the control result detection value acquired by the detection value acquisition unit 16. The evaluation value calculation unit 17 calculates the evaluation value of the traveling plan for the zone based on the difference between the control target value and the control result detection value by set longitudinal position.

Then, in S41, the map update determination system 200 sets the evaluation threshold for the zone by using the map update determination unit 18. The map update determination unit 18 sets the evaluation threshold for the zone based on the position of the zone in the map information. The order of S40 and S41 may be reversed. S40 and S41 may be performed at the same time as well.

Then, in S42, the map update determination system 200 determines whether or not the evaluation value of the traveling plan for the zone falls short of the evaluation threshold by using the map update determination unit 18. The map update determination unit 18 determines whether or not the evaluation value of the traveling plan for the zone falls short of the evaluation threshold for the zone based on the evaluation value of the traveling plan calculated by the evaluation value calculation unit 17 and the set evaluation threshold. The map update determination unit 18 performs the above-described determination with regard to every zone where the evaluation value of the traveling plan has been calculated. The map update determination system 200 allows the processing to proceed to S44 in a case where it is determined that the evaluation value of the traveling plan for the zone falls short of the evaluation threshold for the zone. The map update determination system 200 allows the processing to proceed to S43 in a case where it is determined that the evaluation value of the traveling plan for the zone does not fall short of the evaluation threshold for the zone.

In S43, the map update determination system 200 determines that the map information update is unnecessary in that zone. In S44, the map update determination system 200 determines that the map information update is necessary in that zone. After the processing of S43 or S44, the map update determination system 200 terminates the current map update determination processing. The map update determination system 200 repeats the processing from S40 in a case where a new control result target value has been acquired.

<Effect of Map Update Determination System>

The map update determination system 200 according to the first embodiment that has been described above is capable of determining the necessity of the update of the map information in the zone based on the evaluation value of the traveling plan for the zone calculated from the result of the comparison between the control target value and the control result detection value and the evaluation threshold in that the control target value of the traveling plan depending on the map information and the control result detection value resulting from the automatic driving control that responds to the actual road environment differ from each other in a case where the map information is inconsistent with the actual road environment. Accordingly, with this map update determination system 200, the necessity of the map information update may be determined in an appropriate manner by the use of the automatic driving control for the vehicle.

According to this map update determination system 200, it may be determined that the map information needs to be updated in a case where the map information has an error that causes a sufficient difference to arise between the control target value of the traveling plan and the control result detection value resulting from the automatic driving control, and thus, map information maintenance costs may be significantly reduced compared to a case where the map information is updated by probe car dispatch every time information is obtained with regard to a change in the road environment attributable to a road work or the like. In addition, in a case where no sufficient difference arises between the control target value of the traveling plan and the control result detection value resulting from the automatic driving control, this map update determination system 200 determines that the map information does not have to be updated even if the map information has an error. Accordingly, execution of a map information update that is not necessary for the automatic driving control may be avoided.

Since the map update determination system 200 sets the evaluation threshold for the zone based on the position of the zone in the map information of the map database 4, an appropriate map information update necessity determination in accordance with the position of the zone may be performed. Specifically, the map update determination system 200 may become more likely to determine that the map needs to be updated by setting the evaluation threshold for the zone in the urban area to be higher than the evaluation threshold for the suburban zone in that the zone in the urban area requires a higher level of map information accuracy in relation to the automatic driving control than the suburban zone, and thus, is capable of maintaining sufficiently accurate map information with regard to the zone in the urban area.

Second Embodiment

An automatic driving system 300 and a map update determination system 400 according to a second embodiment will be described. The second embodiment differs significantly from the first embodiment in that a server separated from the vehicle M constitutes the map update determination system 400 and the second embodiment determines a necessity of an update of map information of a server-side map database instead of the in-vehicle map database. The same reference numerals will be used to refer to configurations that are common to the first and second embodiments or equivalent to those of the first embodiment, and detailed description thereof will be omitted herein.

<Configuration of Automatic Driving System>

Figure 8:
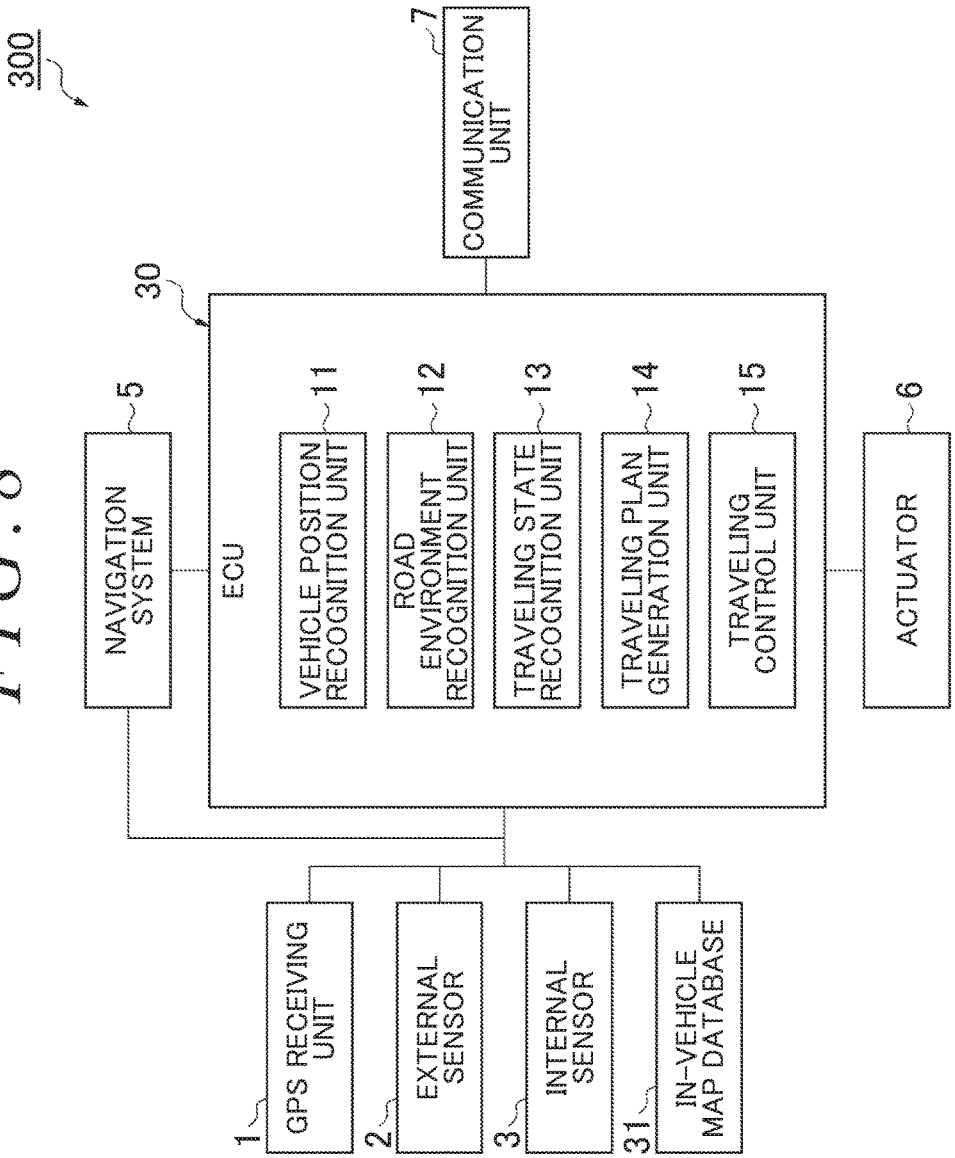
FIG. 8 is a block diagram illustrating an automatic driving system according to a second embodiment.

Firstly, a configuration of the automatic driving system 300 will be described with reference to FIG. 8. FIG. 8 is a block diagram illustrating the automatic driving system 300 according to the second embodiment. As illustrated in FIG. 8, the automatic driving system 300 is provided with an ECU 30 for performing the automatic driving control for the vehicle M. The GPS receiving unit 1, the external sensor 2, the internal sensor 3, the navigation system 5, the actuator 6, the communication unit 7, and an in-vehicle map database 31 are connected to the ECU 30. The in-vehicle map database 31 is a map database that is mounted in the vehicle M. The map information similar to that of the map database 4 according to the first embodiment is stored in the in-vehicle map database 31.

The ECU 30 has the vehicle position recognition unit 11, the road environment recognition unit 12, the traveling state recognition unit 13, the traveling plan generation unit 14, and the traveling control unit 15. Functions of these configurations are similar to those according to the first embodiment.

The traveling plan generation unit 14 according to the second embodiment generates the traveling plan of the vehicle M along the target route R of the navigation system 5 based on the map information of the in-vehicle map database 31. The traveling plan generation unit 14 generates the short-term traveling plan based on the position of the vehicle M recognized by the vehicle position recognition unit 11, the road environment in the vicinity of the vehicle M recognized by the road environment recognition unit 12, the traveling state of the vehicle M recognized by the traveling state recognition unit 13, and the generated traveling plan. The traveling plan generation unit 14 according to the second embodiment does not constitute the map update determination system 400.

The traveling control unit 15 carries out the automatic driving control for the vehicle M based on the short-term traveling plan generated by the traveling plan generation unit 14 and by controlling the output of the actuator 6. In a case where the automatic driving control for the vehicle M is initiated, the automatic driving system 300 transmits the information regarding the target route R to the map update determination system 400 via the communication unit 7. In a case where the automatic driving control for the vehicle M is terminated, the automatic driving system 300 transmits the information regarding the position of the vehicle M relating to the automatic driving control and the information regarding the vehicle speed of the vehicle M relating to the automatic driving control to the map update determination system 400 via the communication unit 7.

<Configuration of Map Update Determination System>

Figure 9:
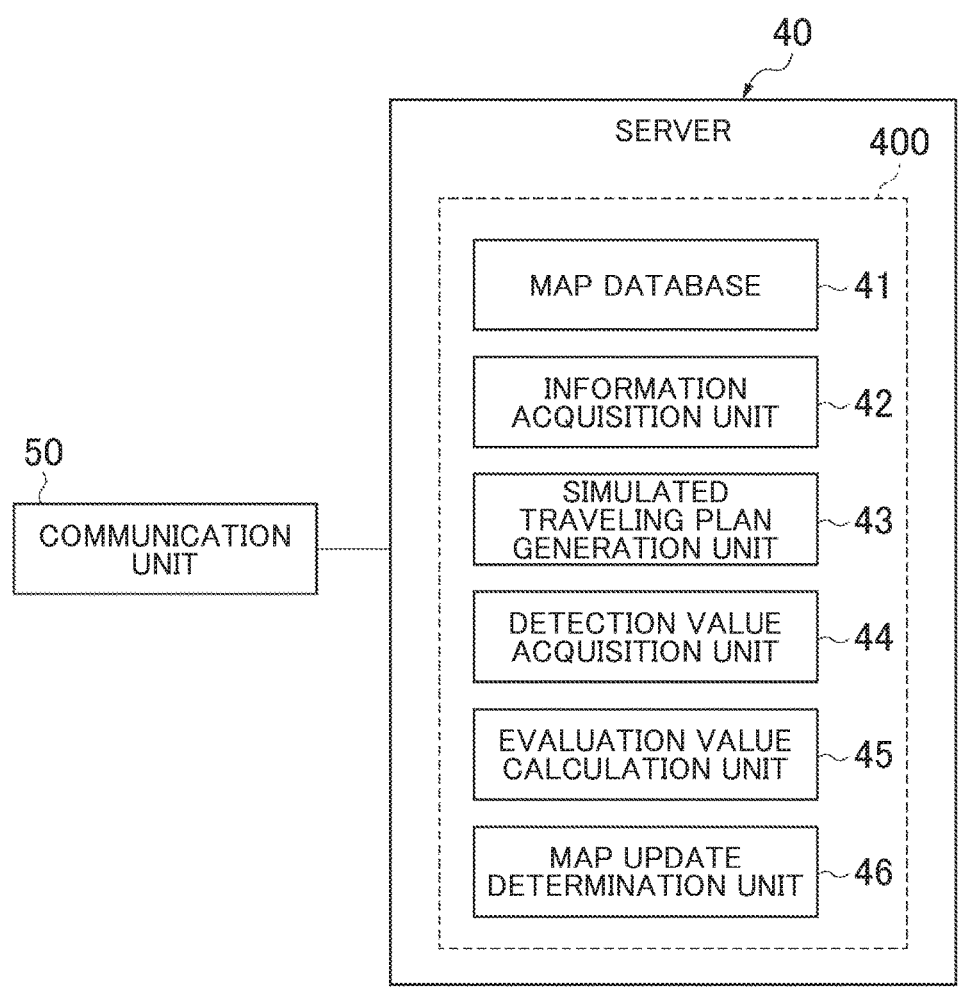
FIG. 9 is a block diagram illustrating a map update determination system according to the second embodiment.

Hereinafter, the map update determination system 400 will be described with reference to FIG. 9. FIG. 9 is a block diagram illustrating the map update determination system 400 according to the second embodiment. As illustrated in FIG. 9, the map update determination system 400 is configured within a server 40. The server 40 is a server that is disposed within a facility of the map information management center. The server 40 is a computer that includes a CPU and a storage unit. A HDD and the like constitute the storage unit. A plurality of the computers may constitute the server 40, too.

A communication unit 50 for performing wireless communication with the vehicle M (automatic driving system 300) is connected to the server 40. The communication unit 50 performs the wireless communication with the communication unit 7 of the vehicle M via an antenna that is installed in a facility of the map information management center. The server 40 performs wireless communication-based information transmission and reception with multiple vehicles, including the vehicle M, via the communication unit 50. A prevalent wireless communication network such as a mobile phone communication network may be used for the information transmission and reception.

The map update determination system 400 has a map database 41, an information acquisition unit 42, a simulated traveling plan generation unit 43, a detection value acquisition unit 44, an evaluation value calculation unit 45, and a map update determination unit 46.

The map database 41 is a database that is disposed in the storage unit of the server 40. The map information similar to that of the map database 4 according to the first embodiment is stored in the map database 41. In the map information management center, the map information that is stored in the map database 41 is managed to become latest information by information collected by the probe car being reflected. The map information of the in-vehicle map database 31 is updated by the map information that is stored in the map database 41 being transmitted to the vehicle M. The map information of the map database 41 is used for updating of the in-vehicle map databases of the multiple vehicles including the vehicle M. The map information that is stored in the map database 41 and the map information of the in-vehicle map database 31 do not necessarily have to correspond to each other.

The information acquisition unit 42 is disposed in the server 40 and acquires information from the vehicle M via the communication unit 50. In a case where the automatic driving control for the vehicle M is initiated, the information acquisition unit 42 acquires the information regarding the target route R for the automatic driving control from the vehicle M. The information acquisition unit 42 may collectively acquire the information regarding the target route R relating to the automatic driving control for a predetermined period of time (such as one day).

The simulated traveling plan generation unit 43 generates a simulated traveling plan based on the target route R of the vehicle M acquired by the information acquisition unit 42 and the map information of the map database 41. The simulated traveling plan is a plan that is generated as a simulation and is not used for the actual automatic driving control for the vehicle M. The simulated traveling plan differs from the traveling plan of the automatic driving system 300 generated based on the in-vehicle map database 31 and is generated based on the map information of the map database 41 of the server 40.

The simulated traveling plan includes a simulated control target value for the vehicle M that depends on the set longitudinal position on the target route R of the vehicle M. The simulated control target value is a simulated control target value for the vehicle M in the simulated traveling plan. The simulated control target value is set in association with each of the set longitudinal positions on the target route R. The simulated control target value includes a simulated target lateral position of the vehicle M and a simulated target vehicle speed of the vehicle M. The simulated target lateral position is a simulated control target lateral position of the vehicle in the simulated traveling plan. The simulated target vehicle speed is a simulated control target vehicle speed of the vehicle in the simulated traveling plan.

The simulated traveling plan generation unit 43 generates the simulated traveling plan by setting the set longitudinal positions on the target route R at the predetermined intervals (such as 1 m) and setting the simulated control target value for each of the set longitudinal positions. The simulated traveling plan generation method is similar to the method by which the traveling plan is generated by the traveling plan generation unit 14 of the automatic driving system 300, and thus, detail description thereof will be omitted herein. The simulated traveling plan generation method does not have to be completely identical to the method by which the traveling plan is generated by the traveling plan generation unit 14 of the automatic driving system 300. There may be a minute difference such as a version difference between the simulated traveling plan generation method and the traveling plan generation method.

The information acquisition unit 42 may acquire the control target value for the vehicle M generated by the traveling plan generation unit 14 instead of the information regarding the target route R. In this case, the simulated traveling plan generation unit 43 may generate the simulated traveling plan based on the control target value and the map information even without the information regarding the target route R.

The detection value acquisition unit 44 is disposed in the server 40 and acquires the control result detection value resulting from the automatic driving control for the vehicle M. The detection value acquisition unit 44 acquires, via the communication unit 50, the information regarding the position of the vehicle M (information regarding the longitudinal position and the lateral position) relating to the automatic driving control and the information regarding the vehicle speed of the vehicle M relating to the automatic driving control. The information regarding the vehicle speed of the vehicle M is acquired in association with the information regarding the longitudinal position of the vehicle M. The information regarding the lateral position of the vehicle M is acquired in association with the information regarding the longitudinal position of the vehicle M, too.

The detection value acquisition unit 44 identifies the vehicle speed (control result vehicle speed) by set longitudinal position and the lateral position (control result lateral position) by set longitudinal position based on the set longitudinal positions on the target route R set by the simulated traveling plan generation unit 43. In this manner, the detection value acquisition unit 44 acquires the control result target value (control result vehicle speed and control result lateral position) resulting from the automatic driving control in association with the set longitudinal position on the target route R. The control result vehicle speed that is associated with the set longitudinal position may be the vehicle speed at a time when the longitudinal position of the vehicle M is the closest to the set longitudinal position among the vehicle speeds of the vehicle M periodically detected by the vehicle speed sensor. The control result lateral position that is associated with the set longitudinal position may be the lateral position at a time when the longitudinal position of the vehicle M is the closest to the set longitudinal position among the lateral positions of the vehicle M periodically recognized by the vehicle position recognition unit 11. The detection value acquisition unit 44 may collectively acquire the control result target values resulting from the automatic driving control for a predetermined period of time (such as one day).

The evaluation value calculation unit 45 calculates the evaluation value of the simulated traveling plan for the zone that is the object of the map information update determination. A zone similar to that according to the first embodiment may be adopted as the zone.

The evaluation value calculation unit 45 calculates the evaluation value of the simulated traveling plan for the zone based on a result of a comparison between the simulated control target value of the simulated traveling plan generated by the simulated traveling plan generation unit 43 and the control result detection value acquired by the detection value acquisition unit 44. The evaluation value calculation unit 45 performs a comparison between the simulated control target value and the control result detection value associated with the same set longitudinal position. The evaluation value calculation unit 45 performs the comparison between the simulated control target value and the control result detection value for each of the set longitudinal positions that are present in the zone and calculates the evaluation value of the simulated traveling plan for the zone based on the results of the comparison. The evaluation value calculation unit 45 calculates the evaluation value of the simulated traveling plan for the zone based on the difference between the simulated control target value and the control result detection value by set longitudinal position. The comparison between the simulated control target value and the control result detection value may be performed by a method that is similar to the method for the comparison between the control target value and the control result detection value according to the first embodiment. In addition, the calculation of the evaluation value of the simulated traveling plan may be performed by a method that is similar to the method for the calculation of the evaluation value of the traveling plan according to the first embodiment. The evaluation value calculation unit 45 calculates each of the evaluation value of the simulated traveling plan relating to the vehicle speed and the evaluation value of the simulated traveling plan relating to the lateral position.

The map update determination unit 46 sets the evaluation threshold for the zone that is used for the map information update determination based on the position of the zone in the map information of the map database 41. The map update determination unit 46 recognizes the zone through which the target route R passes based on the position of the zone in the map information and the target route R. The map update determination unit 46 sets each of the evaluation threshold relating to the vehicle speed and the evaluation threshold relating to the lateral position. The map update determination unit 46 may set the evaluation threshold for the zone by a method similar to that according to the first embodiment. Likewise, the same value as the evaluation threshold according to the first embodiment may be used the evaluation threshold.

The map update determination unit 46 determines the necessity of the update of the map information in the zone based on the evaluation value of the simulated traveling plan calculated by the evaluation value calculation unit 45 and the evaluation threshold. The map update determination unit 46 determines whether or not the evaluation value of the simulated traveling plan for the zone falls short of the evaluation threshold. In a case where it is determined that the evaluation value of the simulated traveling plan for the zone falls short of the evaluation threshold, the map update determination unit 46 determines that the update of the map information is necessary in the zone. The map update determination unit 46 determines that the evaluation value of the simulated traveling plan for the zone falls short of the evaluation threshold for the zone in a case where the evaluation value of the simulated traveling plan for the zone relating to the vehicle speed falls short of the evaluation threshold for the zone relating to the vehicle speed or in a case where the evaluation value of the simulated traveling plan for the zone relating to the lateral position falls short of the evaluation threshold for the zone relating to the lateral position. The map update determination unit 46 may also determine that the update of the map information is necessary in the zone only in a case where the evaluation value of the simulated traveling plan for the zone relating to the vehicle speed falls short of the evaluation threshold for the zone relating to the vehicle speed and the evaluation value of the simulated traveling plan for the zone relating to the lateral position falls short of the evaluation threshold for the zone relating to the lateral position.

<Simulated Traveling Plan Generation Processing of Map Update Determination System>

Hereinafter, a simulated traveling plan generation processing of the map update determination system 400 according to the second embodiment will be described with reference to FIG. 10A. FIG. 10A is a flowchart illustrating the simulated traveling plan generation processing of the map update determination system 400 according to the second embodiment. The flowchart that is illustrated in FIG. 10A is initiated by the information relating to the target route R of the automatic driving control being received from the vehicle M.

As illustrated in FIG. 10A, the map update determination system 400 acquires the information regarding the target route R of the vehicle M in S50 by using the information acquisition unit 42. The information acquisition unit 42 acquires the information regarding the target route R of the vehicle M by the wireless communication via the communication unit 50.

Then, in S51, the map update determination system 400 generates the simulated traveling plan by using the simulated traveling plan generation unit 43. The simulated traveling plan generation unit 43 generates the simulated traveling plan as a simulation in which the vehicle M travels along the target route R as a result of the automatic driving control based on the map information stored in the map database 41 of the server 40 and the target route R. The map update determination system 400 terminates the current simulated traveling plan generation processing in a case where the simulated traveling plan has been generated.

The map update determination system 400 may initiate the simulated traveling plan generation processing after acquiring the control result target value resulting from the automatic driving control for the vehicle M as well. The automatic driving control by the automatic driving system 300 is similar to that according to the first embodiment, and thus, description thereof will be omitted herein.

<Control Result Detection Value Acquisition Processing of Map Update Determination System>

Hereinafter, a control result detection value acquisition processing of the map update determination system 400 according to the second embodiment will be described. FIG. 10B is a flowchart illustrating the control result detection value acquisition processing of the map update determination system 400 according to the second embodiment. The flowchart that is illustrated in FIG. 10B is executed in a case where the information on the position of the vehicle M relating to the automatic driving control or the information on the vehicle speed of the vehicle M relating to the automatic driving control is received from the vehicle M.

As illustrated in FIG. 10B, the map update determination system 400 acquires the control result target value resulting from the automatic driving control in S60 by using the detection value acquisition unit 44. The detection value acquisition unit 44 acquires the control result target value resulting from the automatic driving control in association with the set longitudinal position on the target route R based on the information on the position of the vehicle M and the information on the vehicle speed of the vehicle M relating to the automatic driving control. The detection value acquisition unit 44 terminates the current acquisition processing in a case where the control result detection values associated with all the set longitudinal positions through which the vehicle M has passed during the automatic driving control have been acquired. In the second embodiment, the simulated traveling plan generation processing and the control result detection value acquisition processing may be executed at the same time.

<Map Update Determination Processing of Map Update Determination System>

Figure 11:
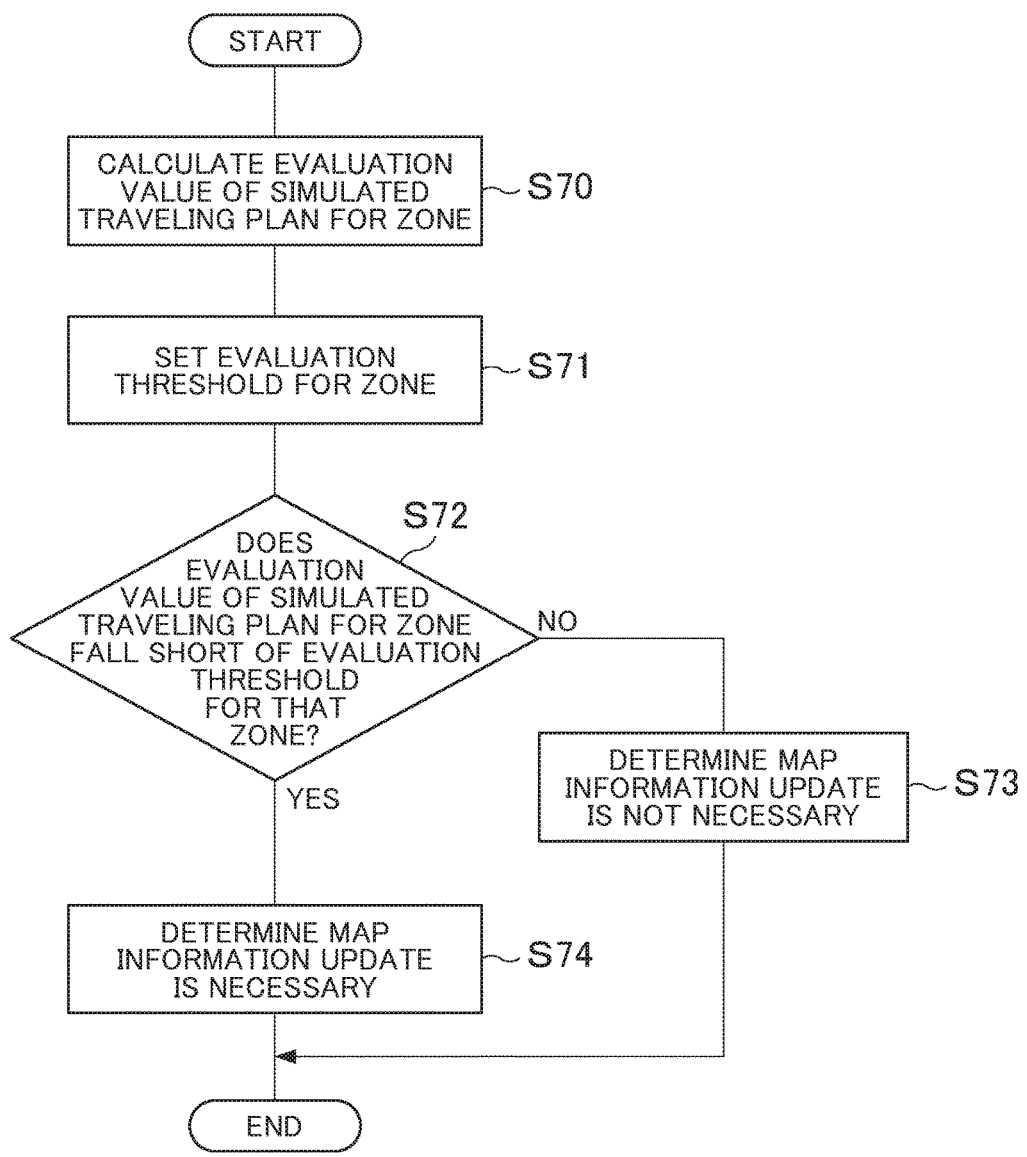
FIG. 11 is a flowchart illustrating a map update determination processing of the map update determination system according to the second embodiment.

Hereinafter, a map update determination processing of the map update determination system 400 according to the second embodiment will be described. FIG. 11 is a flowchart illustrating the map update determination processing of the map update determination system 400 according to the second embodiment. The flowchart that is illustrated in FIG. 11 is executed in a case where the simulated traveling plan generation processing and the control result target value acquisition processing are terminated.

As illustrated in FIG. 11, the map update determination system 400 calculates the evaluation value of the simulated traveling plan for the zone in S70 by using the evaluation value calculation unit 45. The evaluation value calculation unit 45 calculates the evaluation value of the simulated traveling plan for the zone based on the result of the comparison between the simulated control target value of the simulated traveling plan generated by the simulated traveling plan generation unit 43 and the control result detection value acquired by the detection value acquisition unit 44. The evaluation value calculation unit 45 calculates the evaluation value of the simulated traveling plan for the zone based on the difference between the simulated control target value and the control result detection value by set longitudinal position.

Then, in S71, the map update determination system 400 sets the evaluation threshold for the zone by using the map update determination unit 46. The map update determination unit 46 sets the evaluation threshold for the zone based on the position of the zone in the map information. The order of S70 and S71 may be reversed. S70 and S71 may be performed at the same time as well.

Then, in S72, the map update determination system 400 determines, by using the map update determination unit 46, the presence or absence of a zone where the evaluation value of the simulated traveling plan for the zone falls short of the evaluation threshold for the zone. The map update determination system 400 allows the processing to proceed to S74 in a case where it is determined that the evaluation value of the simulated traveling plan for the zone falls short of the evaluation threshold for the zone. The map update determination system 400 allows the processing to proceed to S73 in a case where it is determined that the evaluation value of the simulated traveling plan for the zone does not fall short of the evaluation threshold for the zone.

In S73, the map update determination system 400 determines that the map information update is unnecessary in that zone. In S74, the map update determination system 400 determines that the map information update is necessary in that zone. After the processing of S73 or S74, the map update determination system 400 terminates the current map update determination processing.

<Effect of Map Update Determination System>

The map update determination system 400 according to the second embodiment that has been described above is capable of determining the necessity of the update of the map information in the map database 41 based on the evaluation value of the simulated traveling plan calculated from the result of the comparison between the simulated control target value and the control result detection value and the evaluation threshold in that the simulated control target value of the simulated traveling plan depending on the map information and the control result detection value resulting from the automatic driving control that responds to the actual road environment differ from each other in a case where the map information in the map database 41 of the server 40 is inconsistent with the actual road environment. Accordingly, with this map update determination system 400, the necessity of the map information update may be determined in an appropriate manner in the map database 41 of the server 40 by the use of the automatic driving control for the vehicle. In addition, this map update determination system 400 determines that the map information does not have to be updated, even if the map information in the map database 41 has an error, in a case where no sufficient difference arises between the simulated control target value of the simulated traveling plan and the control result detection value resulting from the automatic driving control. Accordingly, execution of a map information update that is not necessary for the automatic driving control may be avoided.

According to this map update determination system 400, it may be determined that the map information of the map database 41 needs to be updated in a case where the map information has an error that causes a sufficient difference to arise between the simulated control target value of the simulated traveling plan and the control result detection value resulting from the automatic driving control, and thus, map information maintenance costs may be significantly reduced compared to a case where the map information is updated by probe car dispatch every time information is obtained with regard to a change in the road environment attributable to a road work or the like. In addition, this map update determination system 400 sets the evaluation threshold for the zone based on the position of the zone in the map information of the map database 41, and thus, an appropriate map information update necessity determination in accordance with the position of the zone may be performed.

The disclosure is not limited to the embodiments described above. The aspects of this disclosure may be implemented in various forms with various modifications and improvements added to the above-described embodiments based on knowledge of those skilled in the art.

[Modification Examples of Control Target Value (Simulated Control Target Value) and Control Result Target Value]

The control target value of the traveling plan does not necessarily have to include both the target lateral position and the target vehicle speed. The traveling plan generation unit 14 according to the first embodiment may generate a traveling plan that includes only any one of the target lateral position and the target vehicle speed. In this case, the detection value acquisition unit 16 may acquire only the control result target value, that is, the control result lateral position or the control result vehicle speed, corresponding to the target lateral position or the target vehicle speed that is included in the traveling plan.

The traveling plan generation unit 14 may use a target steering angle of the vehicle M instead of the target lateral position of the vehicle M. The target steering angle is a steering angle target value for the vehicle M in the automatic driving control. In addition, the steering torque, a yaw angle, or the yaw rate may be used instead of the steering angle. Furthermore, the traveling plan generation unit 14 may use a target acceleration of the vehicle M instead of the target vehicle speed of the vehicle M. The target acceleration is an acceleration target value for the vehicle M in the automatic driving control.

In this case, the detection value acquisition unit 16 acquires a control result steering angle as the control result detection value corresponding to the target steering angle. The control result steering angle is the steering angle of the vehicle M during the automatic driving control that is detected at the set longitudinal position. The control result steering angle is detected by the steering angle sensor of the vehicle M. In addition, the detection value acquisition unit 16 acquires a control result acceleration as the control result detection value corresponding to the target acceleration. The control result acceleration is the acceleration (deceleration) of the vehicle M during the automatic driving control that is detected at the set longitudinal position. The control result acceleration is detected by the acceleration sensor of the vehicle M.

Likewise, the simulated traveling plan generation unit 43 according to the second embodiment may generate a simulated traveling plan that includes only any one of the simulated target lateral position and the simulated target vehicle speed. In this case, the detection value acquisition unit 44 may acquire only the control result target value, that is, the control result lateral position or the control result vehicle speed, corresponding to the simulated target lateral position or the simulated target vehicle speed that is included in the simulated traveling plan.

The simulated traveling plan generation unit 43 may use a simulated target steering angle of the vehicle M instead of the simulated target lateral position of the vehicle M. The simulated target steering angle is a simulated steering angle of the vehicle M that is a control target in the simulated traveling plan. The steering torque, the yaw angle, or the yaw rate may be used instead of the steering angle. The simulated traveling plan generation unit 43 may use a simulated target acceleration of the vehicle M instead of the simulated target vehicle speed of the vehicle M. The simulated target acceleration is a simulated acceleration of the vehicle M that is a control target in the simulated traveling plan. In this case, the detection value acquisition unit 44 acquires the control result steering angle as the control result detection value corresponding to the simulated target steering angle. In addition, the detection value acquisition unit 44 acquires the control result acceleration as the control result detection value corresponding to the simulated target acceleration.

[Modification Example of Result of Comparison Between Control Target Value (Simulated Control Target Value) and Control Result Detection Value]

The evaluation value calculation unit 17 according to the first embodiment does not necessarily have to use the difference between the control target value and the control result detection value as the result of the comparison between the control target value of the traveling plan and the control result detection value resulting from the automatic driving control. The evaluation value calculation unit 17 may use a ratio between the control target value and the control result detection value instead as the result of the comparison between the control target value of the traveling plan and the control result detection value resulting from the automatic driving control. The result of the comparison may become a dimensionless quantity by the ratio between the control target value and the control result detection value being used as described above. In this case, the evaluation value may become a dimensionless quantity by the ratio between the control target value and the control result detection value being adopted as the evaluation value of the traveling plan. In other words, the evaluation value as a dimensionless quantity may be calculated for each of the vehicle speed and the lateral position that have different units. Then, the evaluation threshold that is used by the map update determination unit 18 may become a dimensionless quantity as well, and the same evaluation threshold may be adopted instead of setting of each of the evaluation threshold relating to the vehicle speed (unit: km/h) and the evaluation threshold relating to the lateral position (unit: m). Likewise, in the evaluation value calculation unit 45 according to the second embodiment, a ratio between the simulated control target value and the control result detection value may be used as the result of the comparison between the simulated control target value of the simulated traveling plan and the control result detection value resulting from the automatic driving control.

[Modification Example of Calculation of Evaluation Value of Traveling Plan (Simulated Traveling Plan)]

The evaluation value calculation unit 17 according to the first embodiment may calculate the evaluation value of the traveling plan for the zone based on the number of the driver's intervention operations or a frequency of the driver's intervention operation with respect to the automatic driving control in the zone as well as the result of the comparison between the control target value and the control result detection value. The intervention operation is an operation through which the automatic driving control for the vehicle M is discontinued and the driving of the vehicle M is switched to the manual driving by the driver by a steering wheel, a brake pedal, or the like being operated by the driver during the automatic driving control for the vehicle M. The automatic driving system 100 determines that the driver's intervention operation has been performed, discontinues the automatic driving control, and switches the driving of the vehicle to the manual driving in a case where a steering angle of the steering wheel, a brake pedal depression amount, or an accelerator pedal depression amount exceeds an intervention threshold set in advance because of the driver during the automatic driving control for the vehicle M. A technique for discontinuing the automatic driving control in response to the driver's intervention operation is known, and thus, detailed description thereof will be omitted herein.

The frequency of the intervention operation refers to the number of the intervention operations per predetermined distance (such as 1 km) or per predetermined period of time (such as 10 minutes). The frequency of the intervention operation is the number of times of repetition of the switching to the manual driving resulting from the driver's intervention operation, the initiation of the automatic driving control, and the switching to the manual driving resulting from the driver's intervention operation during traveling of the vehicle M over the predetermined distance or over the predetermined period of time.

The evaluation value calculation unit 17 calculates the evaluation value of the traveling plan for the zone as a value that decreases as the number of the driver's intervention operations in the zone increases (or the frequency of the intervention operation increases). This is because a possibility of the map information being erroneous and the automatic driving control being contradictory to the driver's intention increases as the number of the driver's intervention operations in the zone increases (or the frequency of the intervention operation increases).

Figures 12A, 12B:
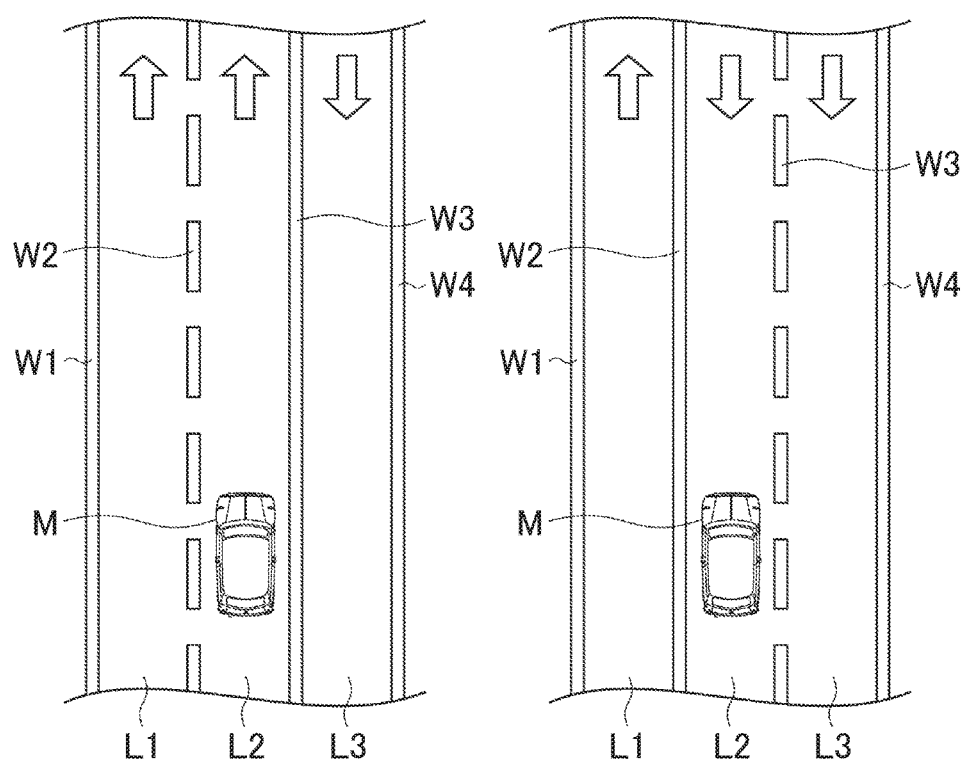
FIG. 12A is a plan view illustrating a road before a road work that causes a change in lane traveling direction.
FIG. 12B is a plan view illustrating the road after the road work that causes the change in lane traveling direction.

Hereinafter, a case where the driver's intervention operation is performed due to a map information error will be described with reference to FIGS. 12A and 12B. FIG. 12A is a plan view illustrating a road before a construction work that causes a change in lane traveling direction. FIG. 12B is a plan view illustrating the road after the construction work that causes the change in lane traveling direction. Lanes L1 to L3 and white lines W1 to W4, which are boundary lines of the lanes L1 to L3, are illustrated in FIGS. 12A and 12B. The lane L1 is a right-end lane of the road when seen from the vehicle M. The lane L3 is a left-end lane of the road when seen from the vehicle M. The lane L2 is a central lane between the lane L1 and the lane L2. The white line W1 is a left-side boundary line of the lane L1. The white line W2 is a boundary line between the lane L1 and the lane L2. The white line W3 is a boundary line between the lane L2 and the lane L3. The white line W4 is a right-side boundary line of the lane L3. In FIG. 12A, the traveling direction of the lane L2 corresponds to the direction in which the vehicle M travels. In this case, the white line W2 becomes a lane boundary line and the white line W3 becomes a centerline. In FIG. 12B, which shows the road after the construction work, the traveling direction of the lane L2 is opposite to the direction in which the vehicle M travels. In this case, the white line W2 becomes the centerline and the white line W3 becomes the lane boundary line.

Herein, it is assumed that the situation of the road before the construction work that is illustrated in FIG. 12A is stored as the map information in the map database 4. In this case, the automatic driving system 100 generates a traveling plan for traveling in the lane L2 based on the map information of the map database 4. The automatic driving system 100 carries out the automatic driving control for the traveling in the lane L2 in accordance with the traveling plan in a case where the automatic driving system 100 is not provided with a function to, for example, distinguish the lane boundary line from the centerline based on the line type of the white line and cannot recognize that the lane L2 is actually an opposite lane. At this time, the driver recognizes the situation of the road after the construction work that is illustrated in FIG. 12B, and performs the intervention operation so that the vehicle M does not travel in the opposite lane.

Next, a case where the driver's intervention operation is performed due to a map information error will be described with reference to FIGS. 13A and 13B. FIG. 13A is a plan view illustrating a road before a change in speed regulation information. FIG. 13B is a plan view illustrating the road after the change in speed regulation information. A speed sign Ha that indicates a maximum legal speed of 60 km/h is illustrated in FIG. 13A. A speed sign Hb that indicates a maximum legal speed of 50 km/h is illustrated in FIG. 13B. FIG. 13A shows a case where the maximum legal speed of the lane L1 in which the vehicle M travels is 60 km/h without exception. FIG. 13B shows a case where a range in which the maximum legal speed is 50 km/h is present, in the lane L1, ahead of a range in which the maximum legal speed is 60 km/h.

Herein, it is assumed that data before the change in the speed regulation information that is illustrated in FIG. 13A is stored as the map information in the map database 4. In this case, the automatic driving system 100 generates the traveling plan based on the map information of the map database 4 such that the vehicle M has a maximum speed of 60 km/h or less. The automatic driving system 100 carries out the automatic driving control for traveling of the vehicle M at a speed of 60 km/h. At this time, the driver recognizes the speed sign Hb that indicates the maximum legal speed of 50 km/h, and performs the intervention operation so that the vehicle M does not travel at 60 km/h.

As described above, an inappropriate automatic driving control that is attributable to the map information error might be carried out in the zone where the number of the driver's intervention operations is large or the zone where the frequency of the driver's intervention operation is high. In this regard, the map update determination system 200 calculates the evaluation value of the traveling plan based on the number of the driver's intervention operations or the frequency of the driver's intervention operation as well as the result of the comparison between the control target value and the control result detection value. Accordingly, the map update determination system 200 may determine that the map information needs to be updated even in cases such as those illustrated in FIGS. 12A, 12B, 13A, and 13B, and thus, a more appropriate map information update determination may be performed.

In addition, the evaluation value calculation unit 17 may calculate the evaluation value of the traveling plan for the zone based on the number of interruptions of the automatic driving control by the automatic driving system 100 or a frequency of the interruption. The frequency of the interruption of the automatic driving control by the automatic driving system 100 refers to the number of the interruptions per predetermined distance (such as 1 km) or per predetermined period of time (such as 10 minutes). The interruption of the automatic driving control by the automatic driving system 100 is a known technique, and thus, detailed description thereof will be omitted herein.

The evaluation value calculation unit 17 calculates the evaluation value of the traveling plan for the zone as a value that decreases as the number of the interruptions of the automatic driving control in the zone increases (or as the frequency of the interruption of the automatic driving control increases).

The automatic driving system 100 interrupts the automatic driving control based on the actual road environment. In a case where the actual white line of the road is blurred and cannot be recognized, the automatic driving system 100 interrupts the automatic driving control.

In a case where the situation of the road before the construction work that is illustrated in FIG. 12A is stored as the map information in the map database 4, the automatic driving system 100 generates the traveling plan based on the map information such that the vehicle M travels in the lane L2. In a case where the lane traveling direction can be determined from the line type of the white line, the automatic driving system 100 determines that the vehicle M is traveling in the opposite lane based on the line types of the white line W2 (centerline) and the white line W3 (lane boundary line) in the situation of the road after the construction work that is illustrated in FIG. 12B and interrupts the automatic driving control.

The map information might be erroneous in a case where the interruption of the automatic driving control is repeated by the automatic driving system 100. In other words, the map information and the actual road environment might differ from each other, due to the interruption of the automatic driving control based on the actual road environment, although the automatic driving control has been initiated with the traveling plan depending on the map information generated in the automatic driving system 100. In this regard, the map update determination system 200 calculates the evaluation value of the traveling plan based on the number of the automatic driving control interruptions by the automatic driving system 100 or the frequency of the interruption as well as the result of the comparison between the control target value and the control result detection value. Accordingly, the map update determination system 200 may determine that the map information needs to be updated even in a case where the actual white line of the road is blurred, and thus, a more appropriate map information update determination may be performed. The map update determination system 200 may also calculate the evaluation value of the traveling plan based on both the number of the driver's intervention operations (or the frequency of the intervention operation) and the number of the automatic driving control interruptions by the automatic driving system 100 (or the frequency of the interruption).

Likewise, the evaluation value calculation unit 45 according to the second embodiment may calculate the evaluation value of the simulated traveling plan by using the number of the driver's intervention operations (or the frequency of the intervention operation) and/or the number of the automatic driving control interruptions by the automatic driving system 300 (or the frequency of the interruption). In this case, the map update determination system 400 acquires information relating to the driver's intervention operation and information relating to the interruption of the automatic driving control by the automatic driving system 300 from the vehicle M via the communication unit 50.

[Modification Example of Generation of Traveling Plan (Simulated Traveling Plan)]

The map information may also include information relating to a lane centerline, which is an imaginary line that connects central positions equidistant from the right and left white lines of the lane in the lane width direction to each other. In this case, the traveling plan generation unit 14 according to the first embodiment may generate the traveling plan based on the information relating to the lane centerline included in the map information such that the vehicle M travels on the lane centerline. By the information relating to the lane centerline, which is an imaginary line, being prepared in advance as described above, the traveling plan generation unit 14 does not have to calculate the central position of the lane from the position information regarding the white line or the curb in the map information, and thus, a computational load may be reduced. In addition, the map information may include information relating to a past traveling trajectory of the vehicle M. In this case, the traveling plan generation unit 14 may generate the traveling plan based on the information relating to the past traveling trajectory of the vehicle M that is included in the map information. Likewise, the simulated traveling plan generation unit 43 according to the second embodiment may generate the traveling plan based on the information relating to the lane centerline that is included in the map information or the information relating to the past traveling trajectory of the vehicle M that is included in the map information.

[Modification Example of Setting of Evaluation Threshold]

The map update determination unit 18 according to the first embodiment may set the evaluation threshold by zone not based on the position of the zone in the map information of the map database 4 but based on a traveling time of the vehicle M in the zone as well. In this case, the vehicle position recognition unit 11 recognizes the position of the vehicle M and the traveling time of the vehicle M in association with each other from a result of the measurement by the GPS receiving unit 1. The map update determination unit 18 recognizes the traveling time of the vehicle M in the zone based on the position of the vehicle M, the traveling time of the vehicle M, and the map information. The map update determination unit 18 sets the evaluation threshold for the zone based on the traveling time of the vehicle M in the zone.

The traveling time of the vehicle M in the zone refers to an intermediate time between a time when the vehicle M in the automatic driving control enters the zone and a time when the vehicle M leaves the zone. The time when the vehicle M enters the zone or the time when the vehicle M leaves the zone may be used as the traveling time of the vehicle M in the zone, too.

The map update determination unit 18 determines, based on the traveling time of the vehicle M in the zone, whether the traveling time is at nighttime or at daytime. The map update determination unit 18 sets the evaluation threshold for the zone where the traveling time is determined to be at nighttime to be lower than the evaluation threshold for the zone where the traveling time is determined to be at daytime in that the white line recognition by the use of the image captured by the camera or the like has a lower level of accuracy and the map information update necessity determination has a lower level of reliability in the nighttime than in the daytime. In a case where the traveling time is at sunset, the map update determination unit 18 may set the evaluation threshold for the zone where the traveling time is determined to be at sunset to be lower than the evaluation threshold for the zone where the traveling time is determined to be at nighttime in that the accuracy of the white line recognition or the like might be significantly reduced by the setting sun in that case.

In a case where, for example, the vehicle M focuses more on a result of detection by a radar sensor than on the image captured by the camera in terms of specification, the map update determination unit 18 may set the evaluation threshold for the zone where the traveling time is determined to be at daytime to be lower than the evaluation threshold for the zone where the traveling time is determined to be at nighttime in that the detection by the radar sensor might have a reduced level of accuracy due to sunlight in the daytime. The map update determination unit 18 may set the evaluation threshold by zone based on both the position of the zone in the map information of the map database 4 and the traveling time of the vehicle M in the zone as well. In addition, the map update determination unit 18 does not necessarily have to set the evaluation threshold for each of the zones and may adopt a constant evaluation threshold value regardless of zone instead.

[Modification Examples of Calculation of Evaluation Value of Traveling Plan (Simulated Traveling Plan) and Determination of Necessity of Update of Map Information]

In the first embodiment, the evaluation value calculation unit 17 does not necessarily have to calculate the evaluation value of the traveling plan as a value greater when the control target value of the traveling plan and the control result detection value resulting from the automatic driving control correspond to each other. Instead, the evaluation value calculation unit 17 may also calculate the evaluation value of the traveling plan as a value smaller when the control target value and the control result detection value correspond to each other. In this case, the map update determination unit 18 determines that the map information needs to be updated with respect to the zone where the evaluation value of the traveling plan is equal to or higher than the evaluation threshold. Likewise, in the second embodiment, the evaluation value calculation unit 45 may calculate the evaluation value of the simulated traveling plan as a value smaller when the simulated control target value of the simulated traveling plan and the control result detection value resulting from the automatic driving control correspond to each other. In this case, the map update determination unit 46 determines that the map information needs to be updated with respect to the zone where the evaluation value of the simulated traveling plan is equal to or higher than the evaluation threshold.

[Modification Example of Determination of Necessity of Update of Map Information]

The evaluation value calculation unit 17 according to the first embodiment may perform weighting (multiplication by a predetermined weighting factor) on one or both of the evaluation value of the traveling plan relating to the vehicle speed in the zone and the evaluation value of the traveling plan relating to the lateral position in the zone and calculate a total thereof as the evaluation value of the traveling plan for the zone. The evaluation value calculation unit 17 may perform normalization (division by a predetermined normalization coefficient) on one or both of the evaluation value of the traveling plan relating to the vehicle speed in the zone and the evaluation value of the traveling plan relating to the lateral position in the zone and calculate a total thereof as the evaluation value of the traveling plan for the zone.

[Modification Example of Automatic Driving Control]

The automatic driving control according to the disclosure does not necessarily have to be a control based on the traveling plan that is performed with regard to both the vehicle speed and the lateral position of the vehicle M. The automatic driving control may also be a control in which an adaptive cruise control [ACC] and an automatic lateral position adjustment for the vehicle M that is based on the traveling plan are combined with each other. The ACC refers to a control in which a constant-speed control for constant-speed traveling of the vehicle M at a set speed set in advance is performed in a case where no preceding car is present in front of the vehicle M and a follow-up control is performed, so that the vehicle speed of the vehicle M is adjusted in accordance with an inter-vehicle distance of the preceding car, in a case where the preceding car is present in front of the vehicle M. In a case where the ACC is used, the traveling plan (traveling plan depending on the map information) relating to the vehicle speed (or acceleration) of the vehicle M is not generated. The automatic lateral position adjustment is a control for adjusting the lateral position of the vehicle M based on the traveling plan that includes the lateral position (target lateral position) of the vehicle M which is set for each of the set longitudinal positions on the target route R. In this case, the map update determination system 200 according to the first embodiment determines the necessity of the update of the map information in the zone based on a result of a comparison between the target lateral position of the traveling plan and the control result lateral position of the control detection result. In addition, the map update determination system 400 according to the second embodiment determines the necessity of the update of the map information in the zone based on a result of a comparison between the simulated target lateral position of the simulated traveling plan and the control result lateral position of the control detection result.

In addition, the automatic driving control may be a control in which a steering support that depends on a sensor result and an automatic vehicle speed adjustment for the vehicle M that is based on the traveling plan are combined with each other. The steering support refers to a lane maintenance support control preventing deviation from the traveling lane by adjustment of the lateral position of the vehicle M. In a case where the steering support is used, the traveling plan (traveling plan depending on the map information) relating to the lateral position of the vehicle M (or the steering angle or the like) is not generated. The automatic vehicle speed adjustment is a control for adjusting the vehicle speed of the vehicle M based on the traveling plan that includes the vehicle speed (target vehicle speed) of the vehicle M which is set for each of the set longitudinal positions on the target route R. In this case, the map update determination system 200 according to the first embodiment determines the necessity of the update of the map information in the zone based on a result of a comparison between the target vehicle speed of the traveling plan and the control result vehicle speed of the control detection result. In addition, the map update determination system 400 according to the second embodiment determines the necessity of the update of the map information in the zone based on a result of a comparison between the simulated target vehicle speed of the simulated traveling plan and the control result vehicle speed of the control detection result.

[Reference Example Using Short-Term Control Target Value of Short-Term Traveling Plan]

The map update determination system 200 according to the first embodiment may calculate the evaluation value of the traveling plan by using the short-term control target value of the short-term traveling plan instead of the control result target value resulting from the automatic driving control. In this case, the evaluation value calculation unit 17 calculates the evaluation value of the traveling plan based on a result of a comparison between the control target value of the traveling plan that depends on the map information and the short-term control target value of the short-term traveling plan that responds to the actual road environment. The evaluation value calculation unit 17 calculates the evaluation value of the traveling plan as a value that is greater when the control target value of the traveling plan and the short-term control target value of the short-term traveling plan correspond to each other. The result of the comparison between the control target value of the traveling plan and the short-term control target value of the short-term traveling plan may be a difference between the control target value of the traveling plan and the short-term control target value of the short-term traveling plan or a ratio between the control target value of the traveling plan and the short-term control target value of the short-term traveling plan.

In a case where the road in the map information is inconsistent with the actual road environment, the map update determination system 200 may determine the necessity of the update of the map information by using the evaluation value of the traveling plan calculated from the result of the comparison between the control target value and the short-term control target value because, in that case, the control target value of the traveling plan that depends on the map information and the short-term control target value of the short-term traveling plan that responds to the actual road environment differ from each other.

What is claimed is:

1. A map update determination system provided with a map database in which map information used for an automatic driving control for a vehicle is stored and configured to determine a necessity of an update of the map information in a zone set in advance, the map update determination system comprising:
   an electronic control unit (ECU) programmed to:
   generate, based on a target route of the vehicle set in advance and the map information, a traveling plan of the vehicle including a control target value for the vehicle in accordance with a position on the target route;
   acquire, in association with the position on the target route, a control result detection value resulting from the automatic driving control for the vehicle executed, based on a road environment in a vicinity of the vehicle recognized by an external sensor of the vehicle being used, a traveling state of the vehicle recognized by an internal sensor of the vehicle being used, a position of the vehicle measured by a position measurement unit of the vehicle, and the traveling plan;
   calculate an evaluation value of the traveling plan for the zone based on a result of a comparison between the control target value and the control result detection value; and
   determine the necessity of the update of the map information on the zone based on the evaluation value of the traveling plan and an evaluation threshold.

2. The map update determination system according to claim 1,
   wherein the ECU is further programmed to set the evaluation threshold for the zone based on a position of the zone in the map information of the map database or a traveling time of the vehicle in the zone.

3. A map update determination system provided with a server capable of communicating with a vehicle performing an automatic driving control and a map database disposed in the server, map information being stored in the map database, and determining a necessity of an update of the map information in a zone set in advance, the map update determination system comprising:
   an electronic control unit (ECU) disposed in the server programmed to:
   acquire information on a target route of the vehicle;
   generate, based on the target route and the map information of the map database, a simulated traveling plan of the vehicle including a simulated control target value for the vehicle in accordance with a position on the target route;
   acquire, in association with the position on the target route, a control result detection value resulting from the automatic driving control for the vehicle executed, based on a road environment in a vicinity of the vehicle recognized by an external sensor of the vehicle being used, a traveling state of the vehicle recognized by an internal sensor of the vehicle being used, a position of the vehicle measured by a position measurement unit of the vehicle, and a traveling plan of the vehicle generated from the target route and map information of an in-vehicle map database mounted in the vehicle;
   calculate an evaluation value of the simulated traveling plan for the zone based on a result of a comparison between the simulated control target value and the control result detection value; and
   determine the necessity of the update of the map information of the map database on the zone based on the evaluation value of the simulated traveling plan and an evaluation threshold.

4. The map update determination system according to claim 3,
   wherein the ECU is further programmed to set the evaluation threshold for the zone based on a position of the zone in the map information of the map database or a traveling time of the vehicle in the zone.

5. The map update determination system according to claim 1,
   wherein as a result of the evaluation value of the traveling plan being less than the evaluation threshold, determining that map information update is necessary.

6. The map update determination system according to claim 1,
   wherein as a result of the evaluation value of the traveling plan being more than the evaluation threshold, determining that map information update is not necessary.

7. The map update determination system according to claim 3,
   wherein as a result of the evaluation value of the traveling plan being less than the evaluation threshold, determining that map information update is necessary.

8. The map update determination system according to claim 3,
   wherein as a result of the evaluation value of the traveling plan being more than the evaluation threshold, determining that map information update is not necessary.

* * * * *